US012795657B2

(12) United States Patent
Goel et al.

(10) Patent No.: US 12,795,657 B2
(45) Date of Patent: Nov. 10, 2026

(54) SYSTEMS, METHODS, AND DEVICES FOR APPLICATION DATA PREBOOKING

(71) Applicant: Apple Inc., Cupertino, CA (US)

(72) Inventors: Neha Goel, Herndon, VA (US); Ralph Hasholzner, Munich (DE); Lakshmi Iyer, Cupertino, CA (US); Mikhail Wilhelm, Munich (DE); Murali Narasimha, Livermore, CA (US); Arjun Bharadwaj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 18/524,050

(22) Filed: Nov. 30, 2023

(65) Prior Publication Data

US 2024/0188073 A1 Jun. 6, 2024

Related U.S. Application Data

(60) Provisional application No. 63/429,701, filed on Dec. 2, 2022.

(51) Int. Cl.

| | |
|---|---|
| ***H04W 72/1268*** | (2023.01) |
| ***H04L 47/30*** | (2022.01) |
| ***H04W 28/02*** | (2009.01) |
| *H04W 88/02* | (2009.01) |

(52) U.S. Cl.
CPC ... *H04W 72/1268* (2013.01); *H04W 28/0278* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 9,439,211 | B2 | 9/2016 | Feuersaenger et al. | |
| 9,819,465 | B2 | 11/2017 | Lee et al. | |
| 10,433,333 | B2 | 10/2019 | Yi et al. | |
| 11,291,036 | B2 | 3/2022 | Liu et al. | |
| 2021/0195629 | A1 * | 6/2021 | Chauvin | H04L 1/0009 |
| 2021/0259012 | A1 * | 8/2021 | Huang | H04W 28/0278 |

(Continued)

FOREIGN PATENT DOCUMENTS

| | | | | | |
|---|---|---|---|---|---|
| WO | 2016055472 | A1 | | 4/2016 | |
| WO | WO-2021254599 | A1 | * | 12/2021 | H04W 72/21 |

*Primary Examiner* — Duc T Duong
(74) *Attorney, Agent, or Firm* — Eschweiler & Potashnik, LLC; Ningjiao Zhang

(57) ABSTRACT

An application may provide prebooking information for multiple packet streams to a baseband processor. The prebooking information may include some or all of a first packet stream and information describing one or more additional packet streams. The baseband processor may generate a buffer status report (BSR) corresponding to multiple packet streams to the extent that the data for the packet streams are to arrive at the baseband processor prior to the a preconfigured duration (e.g., the baseband processor receiving a dynamic grant (DG) from the base station). In this sense, application data may be prebooked, by the baseband processor and/or base station, before actually arriving at the baseband processor. These and many other examples and techniques described herein, including the use of dummy packets for a DG, managing DGs based on dummy packets, and more.

20 Claims, 14 Drawing Sheets

(56) References Cited

U.S. PATENT DOCUMENTS

| | | | | |
|---|---|---|---|---|
| 2021/0385825 | A1 | 12/2021 | Meylan et al. | |
| 2022/0124781 | A1 | 4/2022 | Meylan et al. | |
| 2023/0388928 | A1* | 11/2023 | Khalfi | H04W 52/0229 |
| 2024/0147300 | A1* | 5/2024 | Esswie | H04W 28/0278 |
| 2025/0039932 | A1* | 1/2025 | He | H04B 7/0626 |
| 2025/0106844 | A1* | 3/2025 | Kang | H04W 72/1221 |
| 2025/0151038 | A1* | 5/2025 | Xu | H04W 24/10 |
| 2025/0254562 | A1* | 8/2025 | Esswie | H04W 72/12 |
| 2025/0261038 | A1* | 8/2025 | Yang | H04W 28/0278 |
| 2025/0338168 | A1* | 10/2025 | Wiemann | H04W 72/1221 |

* cited by examiner

SYSTEMS, METHODS, AND DEVICES FOR APPLICATION DATA PREBOOKING

CROSS-REFERENCE TO RELATED APPLICATIONS

This application claims the benefit of priority from U.S. Provisional Patent Application No. 63/429,701, filed Dec. 2, 2022, the contents of which are hereby incorporated by reference in their entirety.

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) and network devices, such as base stations to communicate with one another using different resources and under different conditions.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
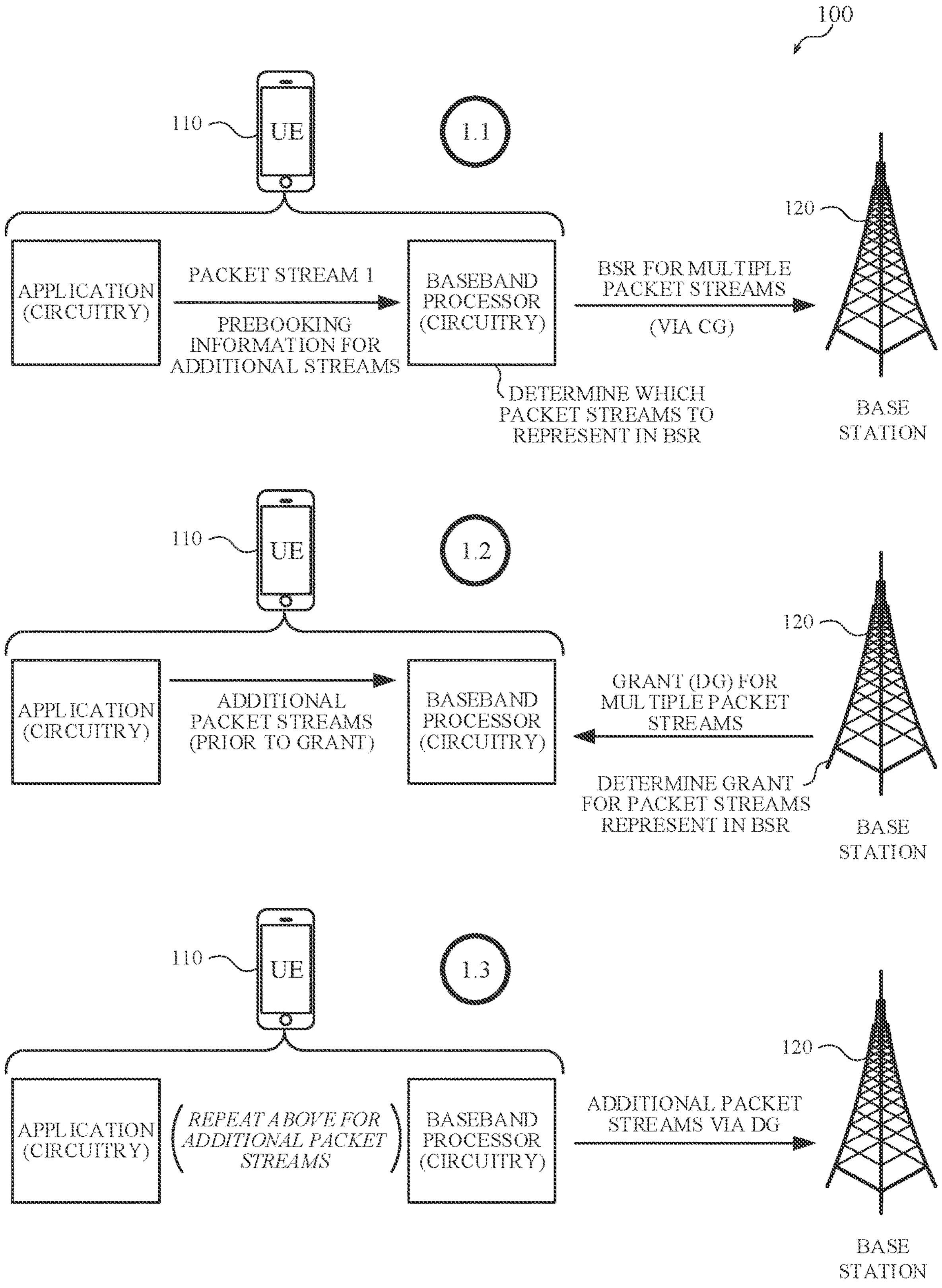
FIG. 1 is a diagram of an example overview of one or more of the techniques described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and/or other network access nodes. UEs and base stations may implement various techniques and communications standards for enabling UEs and base stations to discover one another, establish and maintain connectivity, and exchange information in an ongoing manner. Objectives of such techniques may include connection reliability, seamless connectivity between devices, multiple points of connection, quality of service and throughput rates, and more.

An aspect of enabling communications between a UE and base station may include the base station allocating uplink (UL) resources to the UE, and the UE using the UL resources to communicate information to the base station. UL resources may be part of a configured grant (CG) or a dynamic grant (DG). A CG may include UL resources that the base station receives, assigns, or allocates to the UE as a matter of course (e.g., to enable the UE to communicate information to the base station in general). A DG may include UL resources that the base station receives, assigns, or allocates to the UE as a matter of request (e.g., UL resources that the UE may need at a particular time, under certain conditions, etc.).

For example, a UE initiating a call with another UE may involve an application on the UE generating a packet stream that includes information for the call. The packet stream may be sent to a baseband (BB) processor of the UE, and the baseband processor may generate a buffer status report (BSR) regarding the received packets from the application. A baseband processor, as used herein, may include baseband circuitry that may include components, such as a central processing unit (CPU), memory, communication interfaces, and more. In some implementations, operations described as being performed by a baseband processor may also, or alternatively, be performed by baseband circuitry that may one or more baseband processors and other components, such as a memory device, communication interfaces, and so on. An example of a device that includes several components, including baseband circuitry and multiple baseband processors is described below with reference to FIG. 13.

The BSR generated by the baseband processor may indicate UL resources required by the UE to send the received packets to the base station. The UE may use a CG, received previously from the base station as a matter of course, to send the base station the BSR and some or all of the buffered packet stream. Upon receiving the BSR, the base station may allocate UL resources to the UE as a DG, and the UE may use the allocated UL resources to communicate a remainder of the packet stream to the base station.

While this approach to allocating UL resources to a UE may be somewhat operable, it includes several deficiencies and may not be optimal in some instances. For instance, the foregoing approach is limited to a single packet stream generated by an application of the UE. Meanwhile, applications are often not limited to a single packet stream but instead produce multiple packet streams simultaneously. An example of such an application may include a video call application, where one UE communicates with another UE via a packet stream for video data, a packet stream for audio data, a packet stream for interface data, and so on. As described above, currently available techniques for allocating UL resources to UEs include the UE reporting one BSR per packet stream to the base station, and the base station allocating resources to the UE per BSR. Thus, the UL allocation for applications producing multiple packet streams (e.g., a video call application) are delayed since BSRs and corresponding UL grants are generated one at a time. Each time a BSR is sent to the base station, a correspondence latency accrues from the time the BSR is sent to the time the UL allocation is received. The techniques described herein include solutions that address deficiencies of the currently available technology.

FIG. 1 is a diagram of an example overview 100 of one or more of the techniques described herein. As shown, example overview 100 may include UE 110 and base station 120, and UE 110 may include an application and a baseband processor. The application may be a software application (e.g., a video calling application, multimedia application, etc.) configured to generate packet streams that are sent to the baseband processor. For example, a video calling application may generate a packet stream for image data, a packet stream for audio data, a packet stream for interface data, and so on, and the video calling application may send these packet streams to the baseband processor. The baseband processor may include a memory, processor, and wireless interface to enable UE 110 to communicate with base station 120.

At 1.1, the application may send packet stream 1 and prebooking information for additional streams (e.g., packet stream 2, packet stream 3, etc.) to the baseband processor. The prebooking information may include a size or volume of each packet stream and an arrival time of each packet stream at the baseband processor. Based on the prebooking information, the baseband processor may determine which packet streams to include or represent in a BSR to base station 120. This may include determining which (if any) of the additional packet streams are to arrive at the baseband processor prior to an arrival time of a grant corresponding to the BSR. As such, baseband processor may generate a BRS for multiple packet streams and communicate the BSR to base station 120 using CG resources.

At 1.2, base station 120 may determine a resource grant (e.g., a DG) for UE 110 based on the multiple packet streams represented in the BSR, and the base station 120 may communicate the grant to the baseband processor of UE 110. However, prior to receiving the grant, the baseband processor may have received the additional packet streams that baseband processor determined would arrive prior to the grant. At 1.3, upon receiving the additional packet streams from the application and the resource grant from base station 120, the baseband processor may process and communicate the additional packet streams to base station 120 using the resource grant provided by base station 120. UE 110 may continue to operate as described above so long as the application is generating packet streams for the baseband processor to send to base station 120.

As such, the techniques described herein may include reducing the amount of time involved in transmitting data to base station 120 by prebooking multiple packet streams (via a BSR) before the packet streams actually arrive at the baseband processor but before a corresponding grant is received. The techniques described herein also include solutions for dummy packets for prebooked data, BSR padding, and more. These and other examples and details of the techniques described herein are provided below with reference to the figures.

Figure 2:
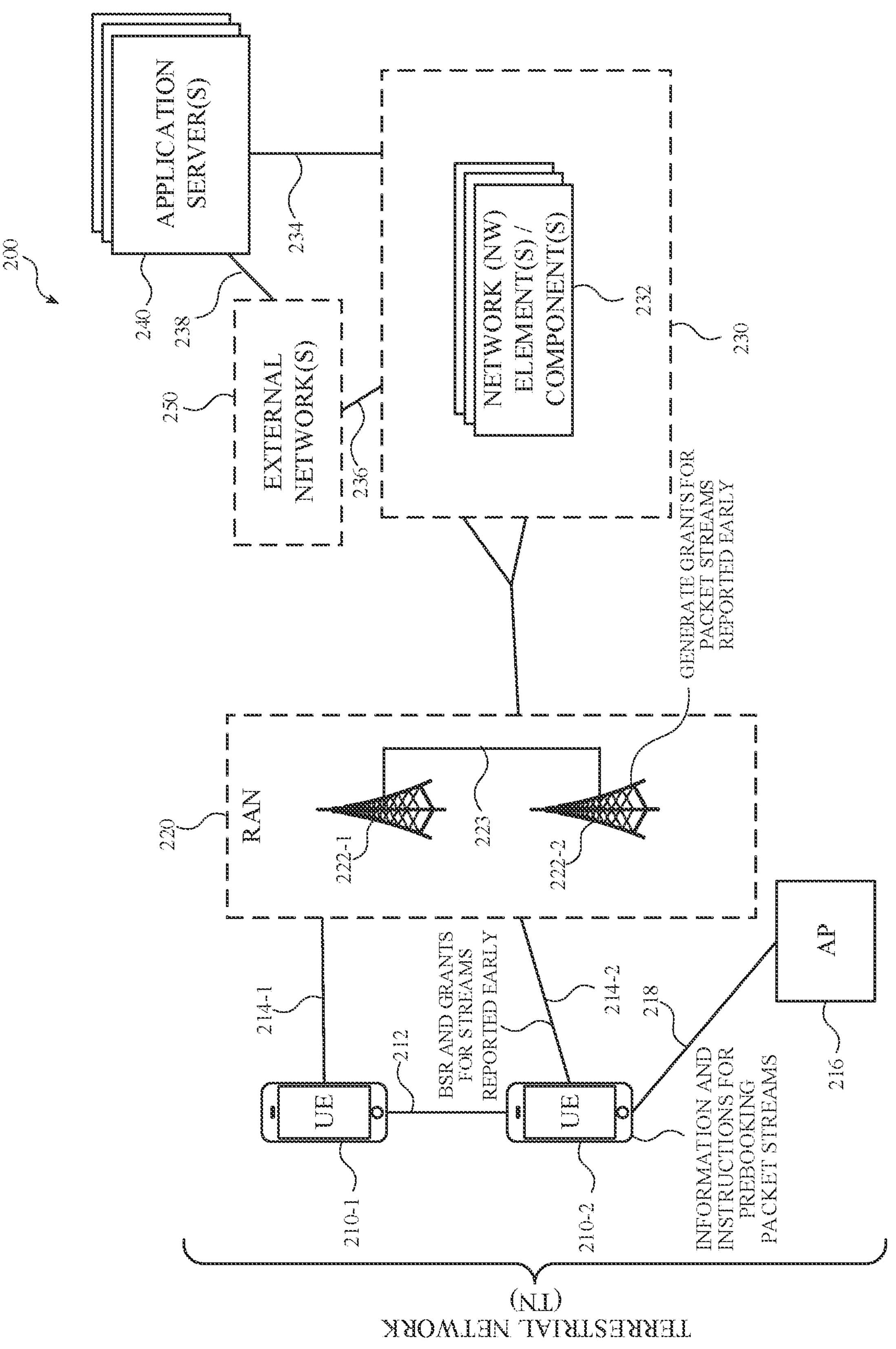
FIG. 2 is a diagram of an example network according to one or more implementations described herein.

FIG. 2 is an example network 200 according to one or more implementations described herein. Example network 200 may include UEs 210-1, 210-2, etc. (referred to collectively as "UEs 210" and individually as "UE 210"), a radio access network (RAN) 220, a core network (CN) 230, application servers 240, and external networks 250.

The systems and devices of example network 200 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, SL connection, etc. The connection may involve a PC5 interface. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may use one or more wireless channels 212 to communicate with one another. As described herein, UE 210-1 may communicate with RAN node 222 to request SL resources. RAN node 222 may respond to the request by providing UE 210 with a dynamic grant (DG) or configured grant (CG) regarding SL resources. A DG may involve a grant based on a grant request from UE 210. A CG may involve a resource grant without a grant request and may be based on a type of service being provided (e.g., services that have strict timing or latency requirements). UE 210 may perform a clear channel assessment (CCA) procedure based on the DG or CG, select SL resources based on the CCA procedure and the DG or CG; and communicate with another UE 210 based on the SL resources. The UE 210 may communicate with RAN node 222 using a licensed frequency band and communicate with the other UE 210 using an unlicensed frequency band.

As described herein, UE 210 may receive and store one or more configurations, instructions, and/or other information for enabling SL-U communications with quality and priority standards. A PQI may be determined and used to indicate a QoS associated with an SL-U communication (e.g., a channel, data flow, etc.). Similarly, an L1 priority value may be determined and used to indicate a priority of an SL-U transmission, SL-U channel, SL-U data, etc. The PQI and/or L1 priority value may be mapped to a CAPC value, and the PQI, L1 priority, and/or CAPC may indicate SL channel occupancy time (COT) sharing, maximum (MCOT), timing gaps for COT sharing, LBT configuration, traffic and channel priorities, and more.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection 218 may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP. Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using stand-alone unlicensed operation, licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL.

The SCCs may be added and removed as required, while changing the PCC may require UE 210 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different physical uplink shared channel (PUSCH) starting positions within a same subframe. To operate in the unlicensed spectrum, UEs 210 and the RAN nodes 222 may also operate using stand-alone unlicensed operation where the UE may be configured with a PCell, in addition to any SCells, in unlicensed spectrum.

The PDSCH may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210-2 within a cell) may be performed at any of the RAN nodes 222 based on channel quality information fed back from any of UEs 210. The downlink resource assignment information may be sent on the PDCCH used for (e.g., assigned to) each of UEs 210.

The PDCCH uses control channel elements (CCEs) to convey the control information, wherein several CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 26).

UE 210 and base station 222 may cooperate to enable a UL resources grant for multiple packet streams to be based on a single BSR. An application of UE 210 may send a baseband processor of UE 210 a first packet stream (e.g., packet stream 1) and prebooking information about one or more additional packet streams (e.g., packet streams 2, 3, and so on). The prebooking information may include a transmission time, a jitter, and a volume for each additional packet stream. The baseband processor may determine which (if any) of the additional packet streams are to arrive prior to a threshold duration from a BSR occasion. The BSR occasion may be a transmission time for the BSR via a CG. The threshold duration may be an amount of time ending prior to baseband processor receiving a UL grant (e.g., a DG) based on the BSR. a corresponding grant being received. That is, the threshold duration may expire before the UL grant is expected to arrive. The additional packet streams may arrive before the UL grant, such that UE 210 may be able to transmit the initial buffered packet stream and the additional buffered packet streams upon reception of the UL grant from base station 222. As described herein, UE 210 may also use dummy packets when a UL grant exceeds the volume of data packets of the packet streams. UE 210 may also, or alternatively use a padding BSR to cause base station 222 to discontinue allocating UL resources to UE 210.

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CN 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

Figure 3:
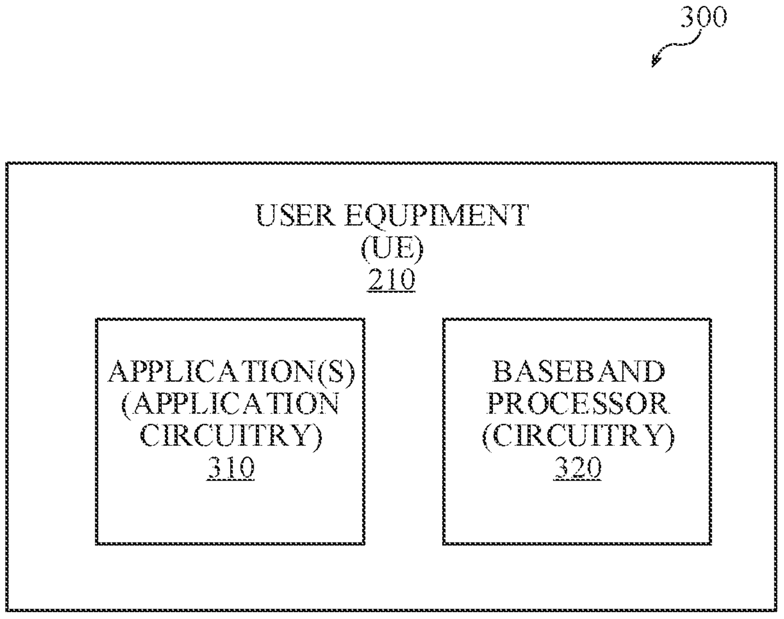
FIG. 3 is a diagram of an example of portions of a user equipment (UE) according to one or more implementations described herein.

FIG. 3 is a diagram of an example 300 of portions of UE 210 according to one or more implementations described herein. As shown, UE 210 may include one or more components such as one or more applications 310, one or more baseband processors 320, etc. Application 310 may include a mobile software application, operating systems feature or tool, etc., that is executable by UE 210.

Application 310 may be executed or enabled by hardware components of UE 210, such as a general processor, central processing unit (CPU), or application circuitry that may include one or more application processors. The processors may include any combination of general-purpose processors and dedicated processors (e.g., graphics processors, application processors, etc.). The processors can be coupled with or can include memory/storage and can be configured to execute instructions stored in a memory or storage device to enable the execution of application 310 to run on UE 210.

As such, application 310 may be stored in a long-term storage device of UE 210 and executed by a combination of a memory device, processors, internal circuitry, and interfaces of UE 210. An example of application 310 may include a communications application that enables users of different UEs 210 to communicate with one another, a multimedia application that enables users to upload and/or download video, music, or multimedia data, and so on. Application 310 may include or involve one or more hardware components of UE 210. For example, Application 310 may be executed by a general processor, central processing unit (CPU), or application circuitry.

Baseband processor 320 may baseband circuitry that may include components, such as a central processing unit (CPU), memory, communication interfaces, supporting circuity and more. In some implementations, operations described as being performed by a baseband processor may also, or alternatively, be performed by baseband circuitry that may one or more baseband processors and other components, such as a memory device, communication interfaces, and so on. An example of a device that includes several components, including baseband circuitry and multiple baseband processors is described below with reference to FIG. 13.

Application 310 may generate a packet stream and send the packet stream to baseband processor 320. Application 310 may also generate information about subsequent packet streams (e.g., packet stream 2, packet stream 3, and so on) and send the information to baseband processor 320 as well. Baseband processor 320 may determine an arrival time of the subsequent packet streams and generate a BSR based on the first packet stream and the subsequent packet streams that are predicted or determined to be received before a predetermined time. The predetermined time may include an estimated reception time of a dynamic grant based on the BSR. Baseband processor 320 may send the BSR to base station 222 and receive a grant (e.g., a dynamic grant) from base station 222 in response thereto. Baseband processor 320 may process the packet streams received from application 310 and use the grant to send the packet streams to base station 222. Additional examples and details are discussed below with reference to the Figures.

Figure 4:
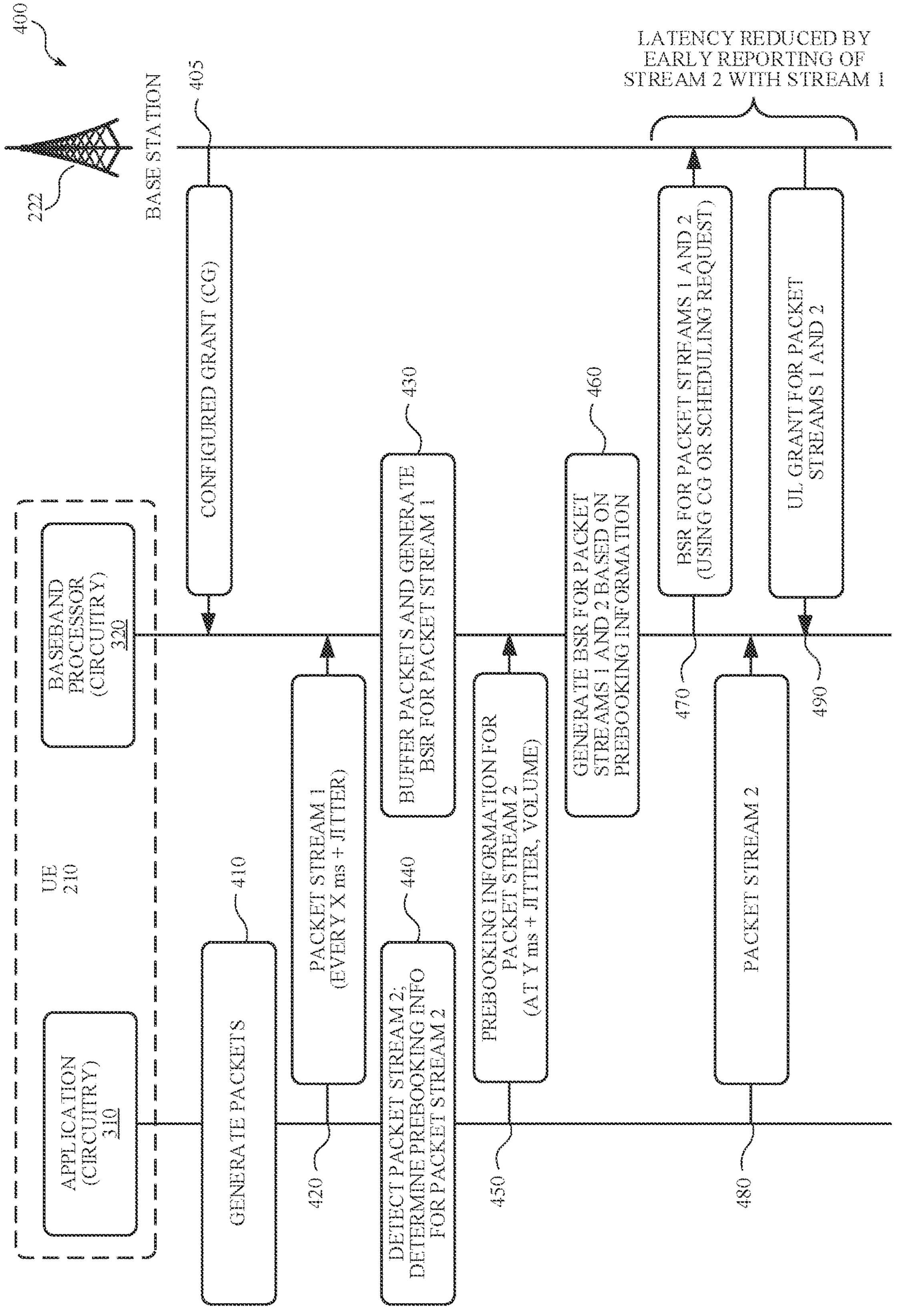
FIG. 4 is a diagram of an example of a process for application data prebooking involving a first and second packet stream according to one or more implementations described herein.

FIG. 4 is a diagram of an example of a process 400 for application data prebooking involving a first and second packet stream according to one or more implementations described herein. Process 400 may be implemented by UE 210 and base station 222, including application 310 and baseband processor 320 of UE 210. In some implementations, some or all of process 400 may be performed by one or more other systems or devices, including one or more of the devices of FIGS. 2-3. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4. Indeed, the techniques described herein may include additional and alternative versions of process 400. Furthermore, as FIG. 4 and the corresponding descriptions include devices performing operations for application data prebooking, corresponding systems, method, and devices claims are enabled by FIG. 4 and the description thereof. FIG. 4 is described below with reference to FIG. 5.

As shown, process 400 may include UE 210 receiving a CG from base station 222 (at 405). For example, base station 222 may be configured to periodically allocate or grant UL resources to UE 210, which UE 210 may use to communicate with base station 222. A CG may include UL resources that the base station receives, assigns, or allocates to the UE as a matter of course (e.g., without receiving a request or prompt from UE 210 for UL resources).

Process 400 may include application 310 of UE 210 generating packets (at 410). The packets may correspond to one packet stream or multiple packet streams and may be associated with a service or operation performed by application 310. Examples of application 310 may include a video calling application, a multimedia application, a data streaming application, etc. In some implementations, application 310 may include multiple applications, and in such implementations, each application 310 may generate one or more packet streams.

Process 400 may include application 310 sending a first packet stream (e.g., packet stream 1) to baseband processor 320 (at 420). Application 310 may send the first packet stream to baseband processor 320 based on a schedule that includes a predesignated or preselected periodicity (e.g., every X number of milliseconds (ms)). In some implementations, the transmission time for sending a packet stream may be based solely on a predesignated or preselected schedule or periodicity. In some implementations, the transmission time for sending a packet stream may be modified by jitter. Jitter, as described herein, may include source jitter or a delay or lag involved in application 310 generating and transmitting data packets or a packet stream to baseband processor 320, resulting in an overall delay between the time the packet stream should have arrived (e.g., under zero jitter conditions) at baseband processor 320 and the time the packet stream actually arrived.

Jitter may be measured or determined by application 310, baseband processor 320, and/or another component of UE 210. A prescheduled transmission time may be modified to be an earlier transmission time as jitter increases and changed again when jitter decreases. In other implementations, jitter may modify an arrival time of a packet stream at baseband processor 320 but not a transmission time by application 310. The periodicity with which a packet stream is sent from application 310 to baseband processor 320 may be based on a predetermined schedule (e.g., a CG), while the arrival time for the packet stream may be based on the predetermined periodicity (e.g., the next transmission time) plus jitter. In some implementations, application 310 may notify the baseband processor 320 of the preselected schedule or periodicity and jitter with which first data streams (e.g., data streams that use a CG) may be sent to baseband processor 320.

Process 400 may include baseband processor 320 buffering packets and generating a BSR for packet stream 1 (at 430). For example, baseband processor 320 may receive the first packet stream from application 310 and may proceed to buffer the packets and generate a corresponding BSR. In some implementations, baseband processor 320 may wait on preparing the BSR until some point after receiving packet stream 1. This may be a predetermined waiting period measured from a reception time of packet stream 1, a trigger time measured from a BSR opportunity or occasion (e.g., a time for transmitting a BSR to base station 222), etc.

Process 400 may also include application 310 detecting a second packet stream (e.g., packet stream 2) and determining prebooking information for the packet stream (at 440). Some or all of the second packet stream may include packets generated previously (e.g., along with packets of the first packet stream at 410). In some implementations, the prebooking information may include a size or volume of packet stream 2, a transmission time of packet stream 2 (e.g., at Y number of milliseconds (ms)), and a jitter for packet stream 2 arriving at baseband processor 320.

Transmission time may indicate when packet stream 2 is to be transmitted, jitter may indicate how long it takes for transmitted packets to arrive at baseband processor 320, and volume may indicate how many packets there are in packet stream 2. Jitter may be the same or different for different packet streams. Additionally, or alternatively, jitter may be a static or default value, or may be periodically measured or determined by application 310, baseband processor 320, and/or another component of UE 210.

Process 400 may include sending the prebooking information for packet stream 2 to baseband processor 320 (at 450). For example, application 310 may send prebooking information for an additional stream to baseband processor 320. The prebooking information may include a transmission or arrival time of the packet stream at baseband processor 320, a jitter for sending a packet stream to baseband processor 320, and a volume of packet stream 2. The volume may include the amount of data, number of packets., etc., of packet stream 2. Indicating the volume may better enable baseband processor 320 to prepare an accurate BSR and, in turn, receive an appropriate resource grant from base station 222.

Figure 5:
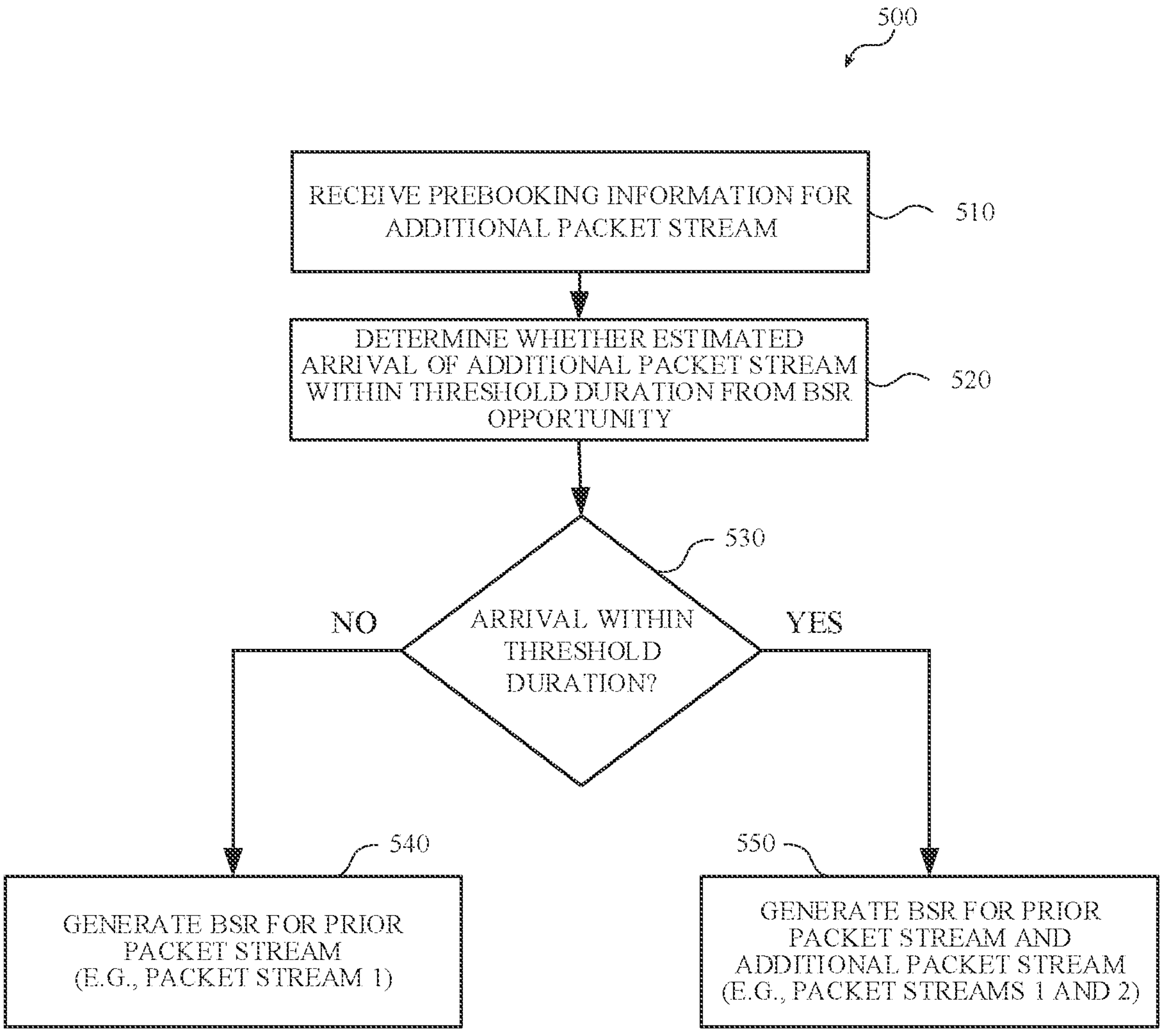
FIG. 5 is a diagram of an example of a process for generating a buffer status report (BSR) according to one or more implementations described herein.

Process 400 may include generating a BSR for packet streams 1 and 2 based on the prebooking information (at 460). For example, baseband processor 320 may receive prebooking information from application 310 and analyze the prebooking information to determine what type of BSR to prepare for base station 222. In some scenarios, baseband processor 320 may prepare a BSR for packet stream 1. In other scenarios, baseband processor 320 may prepare a BSR for packet stream 1 and packet stream 2. For purposes of explaining FIG. 4, assume that baseband processor 320 determines to generate a BSR for both packet streams 1 and 2 since packet stream 2 is received by baseband processor 320 (at 480) prior to a corresponding grant (at 490). FIG. 5 provides an example and description of how baseband processor 320 may determine what type of BSR to prepare for base station 222.

FIG. 5 is a diagram of an example of a process for generating a BSR according to one or more implementations described herein. Process 500 may be implemented by baseband processor 320 of UE 210. In some implementations, some or all of process 500 may be performed by one or more other systems, devices, or components, including one or more of those of FIGS. 2 and/or 3. Additionally, process 500 may include one or more fewer, additional, differently ordered and/or arranged operations than those shown in FIG. 5. In some implementations, some or all of the operations of process 500 may be performed independently, successively, simultaneously, etc., of one or more of the other operations of process 500. As such, the techniques described herein are not limited to a number, sequence, arrangement, timing, etc., of the operations or process depicted in FIG. 5. Indeed, the techniques described herein may include additional and alternative versions of process 500.

As shown, process 500 may include receiving prebooking information for an additional packet stream (block 510). For example, baseband processor 320 may receive prebooking information for one or more additional packet streams from application 310. An additional packet stream, as described herein, may include a packet stream other than an initial or previous packet stream. For example, an initial packet stream may include packet stream 1 (as described herein) and an additional packet stream may include packet stream 2, packet stream 3, and so on.

Process 500 may include determining whether an estimated arrival time of the additional packet stream is within a predefined threshold duration or time from a BSR occasion (block 520). For example, the prebooking information received by baseband processor 320 may include one or more types of information indicating, or enabling the determination of, an expected or scheduled arrival time of the additional packet stream (e.g., packet stream 2) at baseband processor 320. The prebooking information may also include a volume of the additional packet stream. In some implementations, the prebooking information may include an indication of a transmission time of the additional packet stream by application 310 and a jitter associated with packet streams transmitted by application 310 and arriving at baseband processor 320. In some implementations, the prebooking information may include an indication of a transmission time of the additional packet stream by application 310, and baseband processor 320 may be aware of, or may be capable of determining, a jitter associated with such transmission. Baseband processor 320 may be configured to determine the estimated arrival time of the additional packet stream based on a transmission time received from application 310 and a corresponding jitter (whether received from application 310 or determined by baseband processor 320).

Baseband processor 320 may compare the estimated arrival time with a predefined threshold duration measured from a BSR opportunity associated with a previous packet stream (e.g., packet stream 1). For example, baseband processor 320 may be configured to transit a BSR for packet stream 1 according to UL resources allocated to UE 210. The UL resources may include a CG or a DG. Baseband processor 320 may also include (e.g., store in a local memory) a predefined threshold duration associated with the BSR opportunity. The predefined threshold duration may be an amount of time after a BSR is transmitted to base station 222 but before a corresponding resource grant (e.g., a DG) is received or expected to be received (see, e.g., operations 470 and 490 of FIG. 4). In some implementations, UE 210 may determine the predefined threshold duration based on a detected, measured, averaged, etc., amount of time between sending a BSR and receiving a corresponding resource grant. In such implementations, UE 210 may periodically or dynamically measure times between BSRs and grants and may periodically or dynamically update the predefined threshold duration. In some implementations, the predefined threshold duration may be an amount of time less than the measured or determined time between sending a BSR and receiving a corresponding resource grant (e.g., to better ensure that a resource grant does not arrive before the corresponding packet streams).

In some implementations, the predefined threshold duration may be static, such that baseband processor 320 uses the same predefined threshold duration each time. In some implementations, the predefined threshold duration may vary based on communication conditions between UE 210 and base station 222. In such implementation, baseband processor 320 may periodically or in response to one or more triggers (e.g., changing cells, turning off and on, etc.) determine the predefined threshold duration to be applied to BSR opportunities and arrival times of addition packet streams.

Accordingly, baseband processor 320 may determine whether the estimated arrival time of the additional packet stream (e.g., packet stream 2) is within a predefined threshold duration measured from the BSR transmission opportunity. When the arrival time is not within the predefined threshold duration (block 530—NO), process 500 may include generating a BSR for the prior packet stream (block 540). For example, when baseband processor 320 determines that the arrival time of an additional packet stream is not within the predefined threshold duration of a BSR opportunity, baseband processor 320 may generate and transmit a BSR for the prior packet stream (e.g., packet stream 1) but not the additional packet stream (e.g., packet stream 2). By contrast, when the arrival time is within the predefined threshold duration (block 530—YES), process 500 may include generating a BSR for the prior packet stream and the additional packet stream (block 550). For example, when baseband processor 320 determines that an arrival time of the additional packet stream is within the predefined threshold duration of a BSR opportunity, baseband processor 320 may generate and transmit a BSR for the prior packet stream and the additional packet stream (e.g., a BSR for both packet streams 1 and 2).

Referring to FIG. 4, process 400 may include sending a BSR for packet streams 1 and 2 (at 470). For example, baseband process processor 320 may transmit (or cause to be transmitted) a BSR to base station 222. The BSR may include a BSR for packet stream 1 or a BSR for packet stream 1 and packet stream 2. The BSR may be sent using a CG or a prescheduling grant. In some implementations, the BSR may be sent as, in, or along with, a scheduling request message. The scheduling request message may include a grant request or a grant request message. The BSR may include an indication of UL resources that UE 210 may be requesting for the corresponding packet stream(s).

Process 400 may also include application 310 sending packet stream 2 to baseband processor 320 (at 480). For example, after providing baseband processor 320 with prebooking information for packet stream 2, application 310 may proceed to provide packet stream 2 to baseband processor 320. Application 310 may do so according to a predetermined schedule or periodicity (which may have been sent to baseband processor 320 as prebooking information for packet stream 2). As shown, application 310 may send packet stream 2 prior to UE 210 receiving a resource grant from base station 222 for packet stream 2.

Process 400 may include base station 222 sending a UL grant for packet streams 1 and 2 (block 490). For example, upon receiving the BSR from UE 210, base station 222 may determine UL resources to allocate to UE 210 based on the BSR. And even though baseband processor 320 may not have received all of packet stream 2 yet, base station 222 may proceed to generate a grant (e.g., a DG) for packet streams 1 and 2 since the BSR was generated for packet streams 1 and 2. Upon generating the UL grant, base station 222 may transmit the UL grant to UE 210, and while not shown, UE 210 may use the UL grant to transmit packet streams 1 and 2 to base station 222. Accordingly, one or more of the techniques described herein may reduce transmission latency by: 1) reporting multiple packet streams before one or more of the streams has been officially received and buffered at baseband processor 320; and 2) ensuring that all of the reported packet streams are received at baseband processor 320 prior to the corresponding UL grant.

Figure 6:
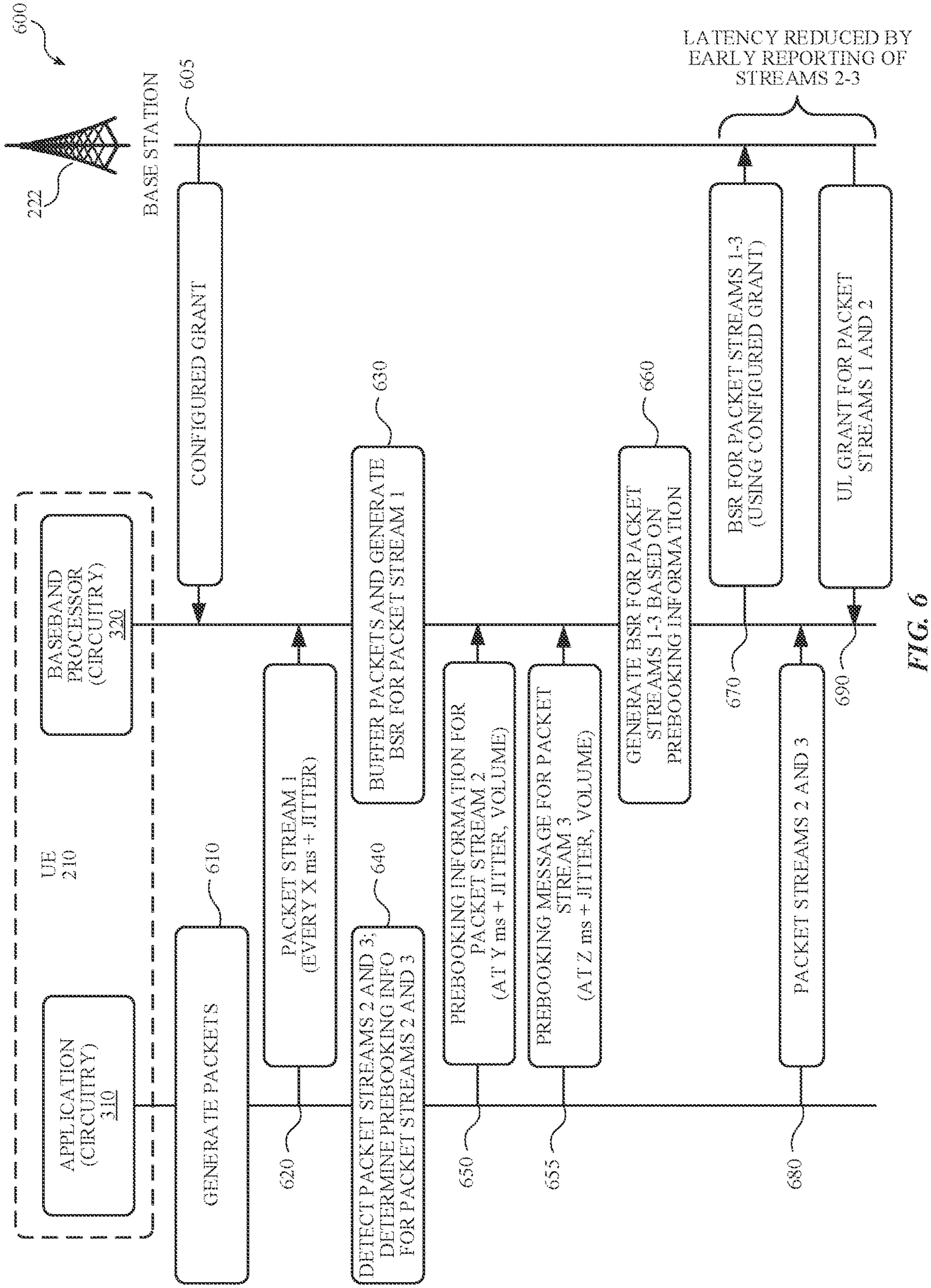
FIG. 6 is a diagram of an example of a process for application data prebooking involving a first, second, and third packet stream according to one or more implementations described herein.

FIG. 6 is a diagram of an example of a process 600 for application data prebooking involving a first, second, and third packet stream according to one or more implementations described herein. Process 600 may be implemented by UE 210 and base station 222, including application 310 and baseband processor 320 of UE 210. In some implementations, some or all of process 600 may be performed by one or more other systems or devices, including one or more of the devices of FIGS. 2-3. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600. As such, the techniques described herein are not limited to a number, sequence, arrangement, timing, etc., of the operations or process depicted in FIG. 6. Indeed, the techniques described herein may include additional and alternative versions of process 600. Furthermore, as FIG. 6 and the corresponding descriptions include devices performing operations for application data prebooking, corresponding systems, method, and devices claims are enabled by FIG. 6 and the description thereof.

As shown, process 600 may include UE 210 receiving a CG from base station 222 (at 605). For example, base station 222 may be configured to periodically allocate, schedule, or grant UL resources to UE 210, which UE 210 may use to communicate with base station 222. A CG may include UL resources that the base station receives, assigns, or allocates to the UE as a matter of course (e.g., without receiving a request or prompt from UE 210 for UL resources).

Process 600 may include application 310 of UE 210 generating packets (at 610). The packets may correspond to one packet stream or multiple packet streams and may be associated with a service or operation performed by application 310. Examples of application 310 may include a video calling application, a multimedia application, a data streaming application, etc. In some implementations, application 310 may include multiple applications, and in such implementations, each application 310 may generate one or more packet streams.

Process 600 may include application 310 sending a first packet stream (e.g., packet stream 1) to baseband processor 320 (at 620). Application 310 may send the first packet stream to baseband processor 320 based on a schedule that includes a predesignated or preselected periodicity (e.g., every X number of milliseconds (ms)). In some implementations, the transmission time for sending a packet stream may be based solely on a predesignated or preselected schedule or periodicity. In some implementations, the transmission time for sending a packet stream may be modified by a signal jitter between application 310 to baseband processor 320. Jitter may include a lag, delay, or latency between when packets are transmitted and when the packets actually arrive.

Jitter may be measured or determined by application 310, baseband processor 320, and/or another component of UE 210. A prescheduled transmission time may be modified to be an earlier transmission time as jitter increases and changed again when jitter decreases. In other implementations, jitter may modify an arrival time of a packet stream at baseband processor 320 but not a transmission time by application 310. The periodicity with which a packet stream is sent from application 310 to baseband processor 320 may be based on a predetermined schedule (e.g., a CG), while the arrival time for the packet stream may be based on the predetermined periodicity (e.g., the next transmission time) plus jitter. In some implementations, application 310 may notify the baseband processor 320 of the preselected schedule or periodicity and jitter with which first data streams (e.g., data streams that use a CG) may be sent to baseband processor 320.

Process 600 may include baseband processor 320 buffering packets and generating a BSR for packet stream 1 (at 630). For example, baseband processor 320 may receive the first packet stream from application 310 and may proceed to buffer the packets and generate a corresponding BSR. In some implementations, baseband processor 320 may wait on preparing the BSR until some point after receiving packet stream 1. This may be a predetermined waiting period measured from a reception time of packet stream 1, a trigger time measured from a BSR opportunity or occasion (e.g., a time for transmitting a BSR to base station 222), etc.

Process 600 may also include application 310 detecting one or more additional packet streams (e.g., packet streams 2 and 3) and determining prebooking information for the additional packet streams (at 640). Some or all of the additional packet streams may include packets generated previously (e.g., along with packets of the first packet stream at 610) and/or packets generated thereafter. In some implementations, some or all of the packets of the additional packet streams may not have been generated yet. In some implementations, the prebooking information may include a size or volume of each additional packet stream, a transmission time of each additional packet stream (e.g., at Y ms for packet stream 2, at Z ms for packet stream 3, and so on), and a jitter for each additional packet stream. The transmission time may indicate when the additional packet stream (e.g., packet stream 2 or 3) is to be transmitted; jitter may indicate how long it takes for transmitted packets to arrive at baseband processor 320; and volume may indicate how many packets there are in a particular packet stream. Jitter may be the same or different for different packet streams. Additionally, or alternatively, jitter may be a static or default value, or may be periodically measured or determined by application 310, baseband processor 320, and/or another component of UE 210.

Process 600 may include sending the prebooking information for the additional packet streams (e.g., packet streams 2 and 3) to baseband processor 320 (at 650 and 655). For example, application 310 may send prebooking information for an additional stream to baseband processor 320. As shown, application 310 may send a set or instance of prebooking information for each individual packet stream (e.g., prebooking information for packet stream 2 and separate prebooking information for packet stream 3). This may be due to the prebooking information being different. For instance, an arrival time and volume of each packet stream may be different.

The prebooking information may include a transmission (e.g., at Y ms for packet stream 2, Z ms for packet stream 3, etc.) or arrival time of the additional packet streams at baseband processor 320, a jitter for the additional packet streams, and a volume of the additional packet streams. The volume may include the amount of data, number of packets, etc., of the additional packet streams. Indicating the volume may better enable baseband processor 320 to prepare an accurate BSR and, in turn, receive an appropriate resource grant from base station 222.

Process 600 may include generating a BSR for the packet streams 1-3 based on the prebooking information (at 660). For example, baseband processor 320 may receive prebooking information from application 310 and analyze the prebooking information to determine what type of BSR to prepare for base station 222. In some scenarios, baseband processor 320 may prepare a BSR for packet stream 1. In some scenarios, baseband processor 320 may prepare a BSR for packet streams 1 and 2. In some implementations, baseband processor 320 may prepare a BSR for packet streams 1, 2, and 3. For purposes of explaining FIG. 6, assume that baseband processor 320 determines to generate a BSR for packet streams 1-3 since packet streams 2 and 3 are to be received by baseband processor 320 (at 680) prior to a corresponding grant (at 690). FIG. 5, described above, provides an example and description of how baseband processor 320 may determine what type of BSR to prepare for base station 222.

Process 600 may include sending a BSR for packet streams 1-3 (at 670). For example, baseband processor 320 may transmit (or cause to be transmitted) a BSR to base station 222. The BSR may include a BSR for packet stream 1, packet streams 1 and 2, or packet streams 1-3. The BSR may be sent using a CG or a prescheduling grant. In some implementations, the BSR may be sent as, in, or along with, a scheduling request message. The scheduling request message may include a grant request or a grant request message. The BSR may include an indication of UL resources that UE 210 may be requesting for the corresponding packet stream (s) (e.g., packet streams 1-3). The BSR may be transmitted with data that can fit the grant size.

Process 600 may also include application 310 sending the additional packet streams (e.g., packet streams 2 and 3) to baseband processor 320 (at 680). For example, after providing baseband processor 320 with prebooking information for packet streams 2 and 3, application 310 may proceed to provide packet streams 2 and 3 to baseband processor 320. Application 310 may do so according to a predetermined schedule or periodicity, which may have been sent to baseband processor 320 as prebooking information for packet streams 2 and 3. As shown, application 310 may send packet streams 2 and 3 prior to UE 210 receiving a resource grant from base station 222 for packet streams 2 and 3.

Process 600 may include base station 222 sending a UL grant for packet streams 1-3 (block 690). For example, upon receiving the BSR from UE 210, base station 222 may determine UL resources to allocate to UE 210 based on the BSR. And even though baseband processor 320 may not have received all of packet streams 1-3 when the BSR is transmitted, base station 222 may nevertheless proceed to generate a grant (e.g., a DG) for packet streams 1-3 since the BSR was generated for packet streams 1-3. Accordingly, one or more of the techniques described herein may reduce transmission latency by: 1) reporting multiple packet streams before one or more of the packet streams has actually been received and buffered at baseband processor 320; and 2) ensuring that all of the reported packet streams are received at baseband processor 320 prior to the corresponding UL grant. Upon generating the UL grant, base station 222 may transmit the UL grant to UE 210, and while not shown, UE 210 may use the UL grant to transmit packet streams 1-3 to base station 222. In some implementations, UE 210 may determine whether the grant allocation is an appropriate size for the corresponding data streams (e.g., data streams 1-3) and may generate one or more dummy packets when the grant allocation exceeds the volume of the packet streams to be transmitted.

Figure 7:
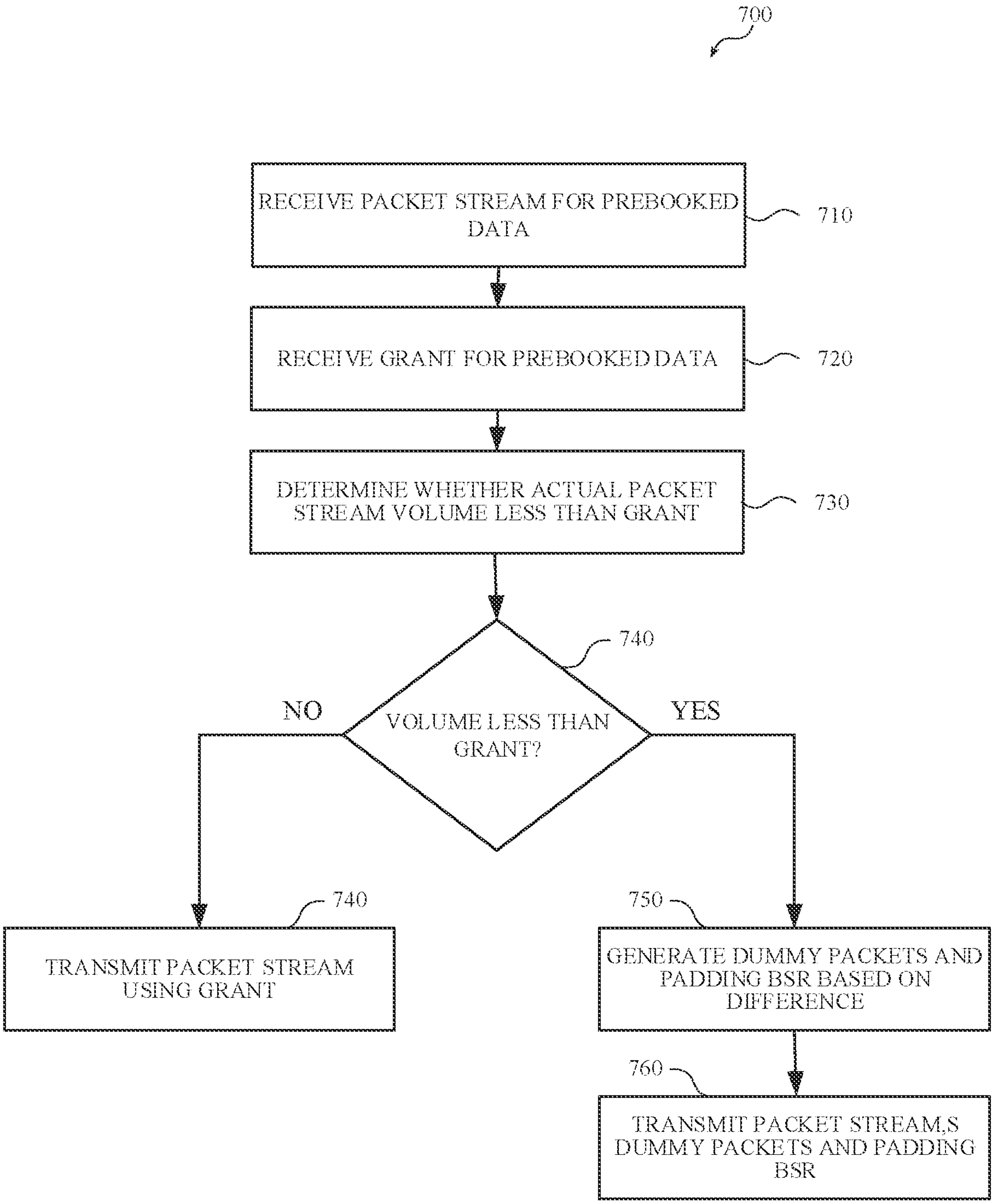
FIG. 7 is a diagram of an example of a process for generating a dummy packet according to one or more implementations described herein.

FIG. 7 is a diagram of an example of a process 700 for generating a dummy packet according to one or more implementations described herein. Process 700 may be implemented by UE 210, application 310, and/or baseband processor 320. In some implementations, some or all of process 700 may be performed by one or more other systems, devices, or components, including one or more of the systems, devices, or components of FIGS. 2-3. Additionally, process 700 may include one or more fewer, additional, differently ordered and/or arranged operations than those shown in FIG. 7. In some implementations, some or all of the operations of process 700 may be performed independently, successively, simultaneously, etc., of one or more of the other operations of process 700. As such, the techniques described herein are not limited to a number, sequence, arrangement, timing, etc., of the operations or process depicted in FIG. 7. Indeed, the techniques described herein may include additional and alternative versions of process 700.

As shown, process 700 may include receiving a packet stream for prebooked data (block 710). Prebooked data, as described herein, may include a data of a packet stream for which a BSR was transmitted to base station 222 based on prebooking information (before the packet stream is actually received). Baseband processor 320 may send the BSR to base station 222, receive the packet stream for prebooked data, and then receive a corresponding resource allocation (e.g., a DG) from base station 222 (block 720).

Process 700 may include determining whether an actual packet stream volume is less than the grant or resource allocation for the packet stream (block 730). For example, baseband processor 320 may compare a DG to a volume of one or more packet streams associated with the DG and determine whether a capacity of the DG is greater than the volume of the packet streams. The packet streams may include an initial or first packet stream (e.g., packet stream 1) and one or more additional packet streams (e.g., packet stream 2, packet stream 3, etc.).

When the volume of the packet streams is not less than the capacity of the DG (block 740—NO), process 700 may proceed by transmitting the packet streams using the grant (block 740). When the volume of the packet streams is less than the capacity of the DG (block 740—YES), process 700 may proceed by generating one or more dummy packets to make up for the difference between the volume of the packet streams and the capacity of the DG. In some implementations, baseband processor 320 may also, or alternatively, determine that the packet streams are the last packet streams to be received from application 310. In such a scenario, baseband processor 320 may generate a padding BSR configured to indicate to base station 222 that no more resource allocations are needed or required (block 750). For instance, if base station 222 were to continue allocating resources to UE 210, base station 222 would discontinue doing so upon reception of the padding BSR. Process 700 may also include transmitting the packet streams, dummy packets, and padding BSR to base station 222 (block 760).

Figure 8:
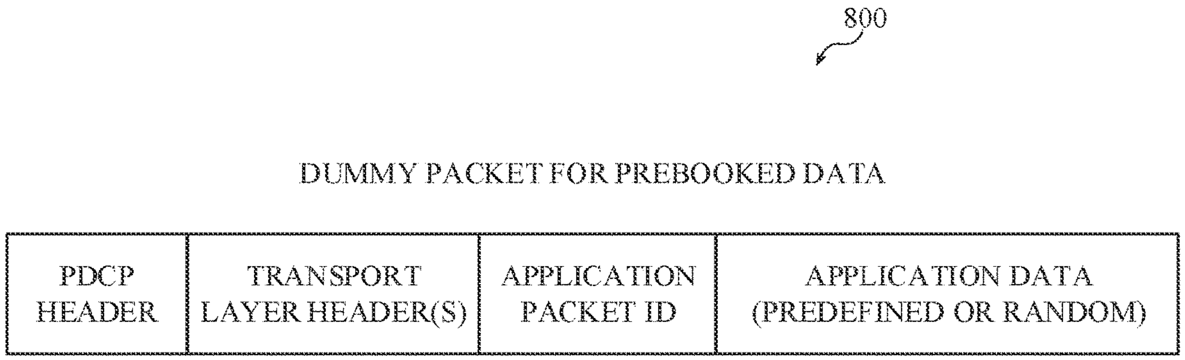
FIG. 8 is a diagram of an example of a dummy packet according to one or more implementations described herein.

FIG. 8 is a diagram of an example of a dummy packet 800 according to one or more implementations described herein. As shown, dummy packet 800 may include a packet data convergence protocol (PDCP) header, a transport layer header, an application packet ID, and application data. The values of the PDCP header, the transport layer header, and/or the application packet ID may be consistent with the other packets of the packet stream. The application data may be a predefined set of data indicating that the packet is a dummy packet for prebooked data. In such scenarios, a receiver that receives the packet may be capable of quickly identifying the packet as a dummy packet and discarding it. In some implementations, the application data may instead be a randomly generated set of meaningless data.

In some implementations, dummy packet 800 may include one or more fewer, additional, differently ordered, and/or arranged types of information than those shown in FIG. 8. For example, in some implementations, one or more of the types of information of dummy packet 800 may be communicated to base station 222 by UE 210. Similarly, to implement one or more of the techniques described herein, UE 210 may store and/or use one or more types of information that differs from dummy packet 800. As such, example dummy packet 800 is provided as a non-limiting example of information that may be used to implement one or more of the techniques described herein.

Figure 9:
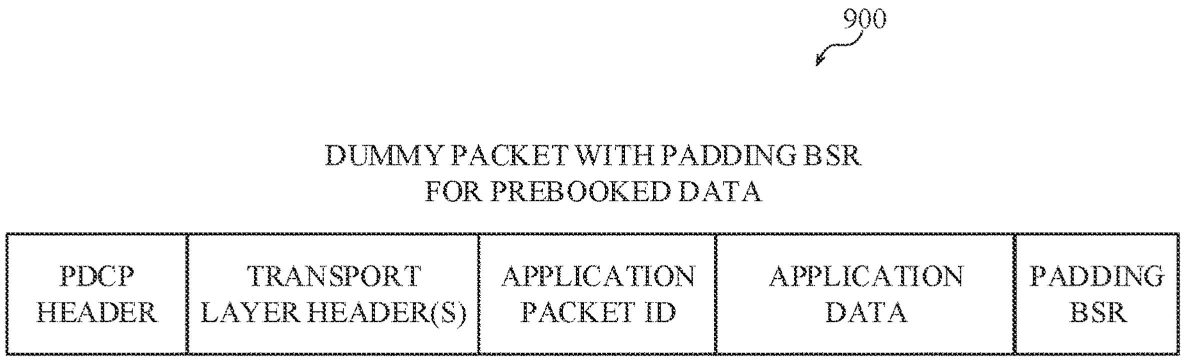
FIG. 9 is a diagram of an example of a dummy packet with BSR padding according to one or more implementations described herein.

FIG. 9 is a diagram of an example of a dummy packet 900 with BSR padding according to one or more implementations described herein. As shown, dummy packet 900 may include a PDCP header, a transport layer header, an application packet ID, application data, and a padding BSR. The values of the PDCP header, the transport layer header, and/or the application packet ID may be consistent with the other packets of the packet stream. The application data may be a predefined set of data indicating that the packet is a dummy packet for prebooked data. In such scenarios, a receiver that receives the packet may be capable of quickly identifying the packet as a dummy packet and discarding it. In some implementations, the application data may instead be a randomly generated set of meaningless data. The padding BSR may include information indicating that this is the last of the packet streams and/or that no more resources allocations (e.g., DGs) are needed. As such, the padding BSR may cause base station 222 to discontinue allocating DGs to UE 210 for the packet streams from application 310.

In some implementations, dummy packet 800 may include one or more fewer, additional, differently ordered, and/or arranged types of information than those shown in FIG. 9. For example, in some implementations, one or more of the types of information of dummy packet 900 may be communicated to base station 222 by UE 210. Similarly, to implement one or more of the techniques described herein, UE 210 may store and/or use one or more types of information that differs from dummy packet 900. As such, example dummy packet 800 is provided as a non-limiting example of information that may be used to implement one or more of the techniques described herein.

Figure 10:
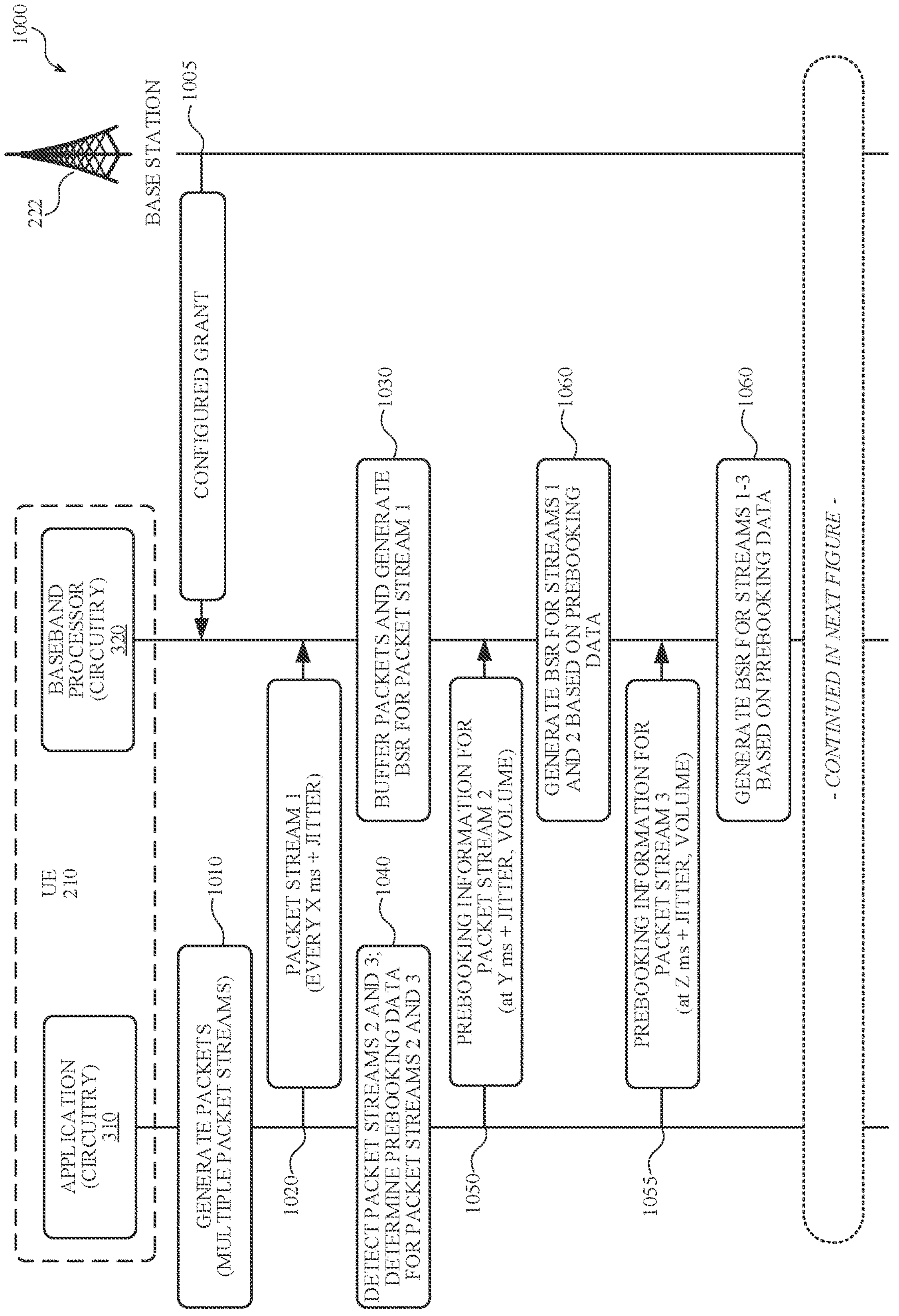
FIGS. 10-11 are diagrams of an example of a process for application data prebooking involving a first, second, and third packet stream according to one or more implementations described herein.
Figure 11:
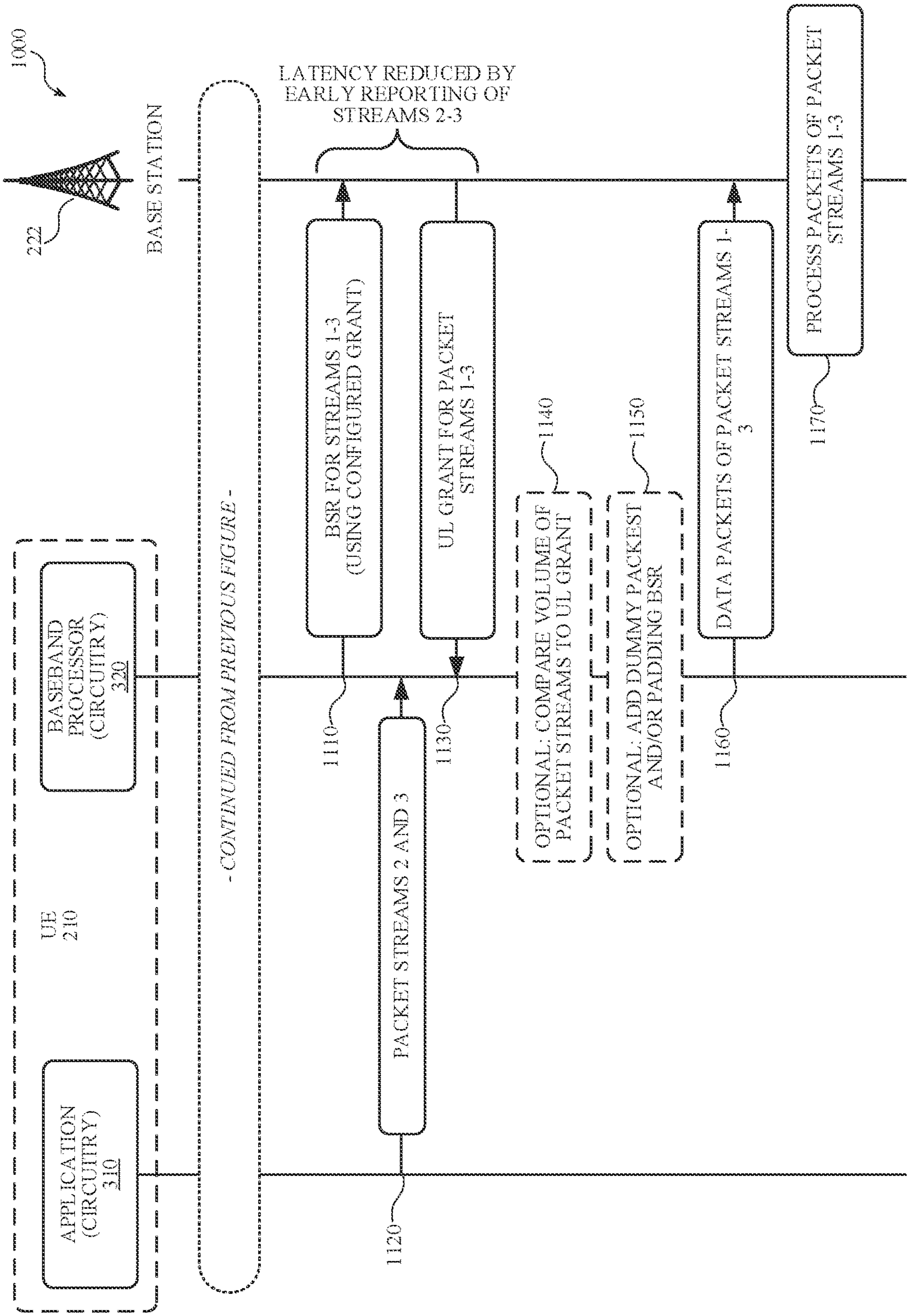

FIGS. 10-11 are diagrams of an example of a process 1000 for application data prebooking involving a first, second, and third packet stream according to one or more implementations described herein. Process 1000 may be implemented by UE 210 and base station 222, including application 310 and baseband processor 320 of UE 210. In some implementations, some or all of process 1000 may be performed by one or more other systems or devices, including one or more of the devices of FIGS. 2-3. Additionally, process 1000 may include one or more fewer, additional, differently ordered and/or arranged operations than those shown in FIGS. 10-11.

In some implementations, some or all of the operations of process 1000 may be performed independently, successively, simultaneously, etc., of one or more of the other operations of process 1000. As such, the techniques described herein are not limited to a number, sequence, arrangement, timing, etc., of the operations or process depicted in FIGS. 10-11. Indeed, the techniques described herein may include additional and alternative versions of process 1000. Furthermore, as FIGS. 10-11 and the corresponding descriptions include devices performing operations for application data prebooking, corresponding systems, method, and devices claims are enabled by FIGS. 10-11 and the description thereof.

As shown, process 1000 may include UE 210 receiving a CG from base station 222 (at 1005). For example, base station 222 may be configured to periodically allocate, schedule, or grant UL resources to UE 210, which UE 210 may use to communicate with base station 222. A CG may include UL resources that the base station receives, assigns, or allocates to the UE as a matter of course (e.g., without receiving a request or prompt from UE 210 for UL resources).

Process 1000 may include application 310 of UE 210 generating packets (at 1010). The packets may correspond to one packet stream or multiple packet streams and may be associated with a service or operation performed by application 310. Examples of application 310 may include a video calling application, a multimedia application, a data streaming application, etc. In some implementations, application 310 may include multiple applications, and in such implementations, each application 310 may generate one or more packet streams.

Process 1000 may include application 310 sending a first packet stream (e.g., packet stream 1) to baseband processor 320 (at 1020). Application 310 may send the first packet stream to baseband processor 320 based on a schedule that includes a predesignated or preselected periodicity (e.g., every X number of milliseconds (ms)). In some implementations, the transmission time for sending a packet stream may be based solely on a predesignated or preselected schedule or periodicity. In some implementations, the transmission time for sending a packet stream may be modified by a signal jitter between application 310 to baseband processor 320. Jitter may include a lag, delay, or latency between when packets are transmitted and when the packets actually arrive.

Jitter may be measured or determined by application 310, baseband processor 320, and/or another component of UE 210. A prescheduled transmission time may be modified to be an earlier transmission time as jitter increases and changed again when jitter decreases. In other implementations, jitter may modify an arrival time of a packet stream at baseband processor 320 but not a transmission time by application 310. The periodicity with which a packet stream is sent from application 310 to baseband processor 320 may be based on a predetermined schedule (e.g., a CG), while the arrival time for the packet stream may be based on the predetermined periodicity (e.g., the next transmission time) plus jitter. In some implementations, application 310 may notify the baseband processor 320 of the preselected schedule or periodicity and jitter with which first data streams (e.g., data streams that use a CG) may be sent to baseband processor 320.

Process 1000 may include baseband processor 320 buffering packets and generating a BSR for packet stream 1 (at 1030). For example, baseband processor 320 may receive the first packet stream (e.g., packet stream 1) from application 310 and may proceed to buffer the packets and generate a corresponding BSR. In some implementations, baseband processor 320 may wait on preparing the BSR until some point after receiving packet stream 1. This may be a predetermined waiting period measured from a reception time of packet stream 1, a trigger time measured from a BSR opportunity or occasion (e.g., a time for transmitting a BSR to base station 222), etc.

Process 1000 may also include application 310 detecting additional packet streams (e.g., packet streams 2 and 3) and determining prebooking information for the additional packet streams (at 1040). Some or all of the additional packet streams may include packets generated previously (e.g., along with packets of the first packet stream at 610) and/or packets generated thereafter. In some implementations, some or all of the packets of the additional packet streams may not have been generated yet. In some implementations, the prebooking information may include a size or volume of each additional packet stream, a transmission time of each additional packet stream (e.g., at Y ms for packet stream 2, at Z ms for packet stream 3, and so on), and a jitter for each additional packet stream. The transmission time may indicate when the additional packet stream (e.g., packet stream 2 or 3) is to be transmitted; jitter may indicate how long it takes for transmitted packets to arrive at baseband processor 320; and volume may indicate how many packets there are in a particular packet stream. Jitter may be the same or different for different packet streams. Additionally, or alternatively, jitter may be a static or default value, or may be periodically measured or determined by application 310, baseband processor 320, and/or another component of UE 210.

Process 1000 may include sending the prebooking information for packet stream 2 to baseband processor 320 (at 1050). For example, application 310 may send prebooking information for an additional stream to baseband processor 320. The prebooking information may include a transmission time of the packet stream at baseband processor 320, a jitter for sending a packet stream to baseband processor 320, and a volume of packet stream 2. The volume may include the amount of data, number of packets., etc., of packet stream 2. Indicating the volume may better enable baseband processor 320 to prepare an accurate BSR and, in turn, receive an appropriate resource grant from base station 222.

Process 1000 may include generating a BSR for packet streams 1 and 2 based on the prebooking information (at 1060). For example, baseband processor 320 may receive prebooking information from application 310 and analyze the prebooking information to determine what type of BSR to prepare for base station 222. In some scenarios, baseband processor 320 may prepare a BSR for packet stream 1 (e.g., when the transmission time or arrival time of packet stream 2 is too late). In other scenarios, baseband processor 320 may prepare a BSR for packet stream 1 and packet stream 2 (e.g., when packet stream 2 is to arrive within a threshold duration from a BSR opportunity). For purposes of explaining FIG. 10, assume that baseband processor 320 determines to generate a BSR for both packet streams 1 and 2 since packet stream 2 is received by baseband processor 320 prior to a corresponding grant (at 1120 and 1130 of FIG. 11).

Process 1000 may include sending the prebooking information for packet stream 3 to baseband processor 320 (at 1070). For example, application 310 may send prebooking information for an additional stream to baseband processor 320. The prebooking information may include a transmission time of packet stream 3 at baseband processor 320, a jitter for sending packet stream 3 to baseband processor 320, and a volume of packet stream 3. The volume may include the amount of data, number of packets, etc., of packet stream 3. Indicating the volume may better enable baseband processor 320 to prepare an accurate BSR and, in turn, receive an appropriate resource grant from base station 222.

Process 1000 may include generating a BSR for packet streams 1-3 based on the prebooking information (at 1060). For example, baseband processor 320 may receive prebooking information from application 310 and analyze the prebooking information to determine what type of BSR to prepare for base station 222. In some scenarios, baseband processor 320 may prepare a BSR for packet streams 1 and 2 (e.g., when the transmission time or arrival time of packet stream 3 is too late). In other scenarios, baseband processor 320 may prepare a BSR for packet streams 1-3 (e.g., when packet stream 3 is to arrive within a threshold duration from a BSR opportunity). For purposes of explaining FIG. 10, assume that baseband processor 320 determines to generate a BSR for packet streams 1-3 since packet stream 3 is received by baseband processor 320 prior to a corresponding grant (at 1120 and 1130 of FIG. 11). In some implementations, baseband processor 320 may prepare a single BSR for multiple packet stream (e.g., packet streams 1-3). In some implementations, baseband processor 320 may prepare a BSR for each packet stream (e.g., a BSR for packet stream 1, a BSR for packet stream 2, etc.) and send all of the BSRs to base station 222 in the same UL transmission.

Process 1000 may include generating a BSR for the packet streams 1-3 based on the prebooking information (at 1060). For example, baseband processor 320 may receive prebooking information from application 310 and analyze the prebooking information to determine what type of BSR to prepare for base station 222. In some scenarios, baseband processor 320 may prepare a BSR for packet stream 1. In some scenarios, baseband processor 320 may prepare a BSR for packet streams 1 and 2. In some implementations, baseband processor 320 may prepare a BSR for packet streams 1, 2, and 3. For purposes of explaining FIG. 6, assume that baseband processor 320 determines to generate a BSR for packet streams 1-3 since packet streams 2 and 3 are to be received by baseband processor 320 (at 680) prior to a corresponding grant (at 690). FIG. 5, described above, provides an example and description of how baseband processor 320 may determine what type of BSR to prepare for base station 222.

Referring to FIG. 11, process 1000 may include sending a BSR for packet streams 1-3 (at 1110). For example, baseband processor 320 may transmit (or cause to be transmitted) a BSR to base station 222. The BSR may include a BSR for packet stream 1, packet streams 1 and 2, or packet streams 1-3. The BSR may be sent using a CG or a prescheduling grant. In some implementations, the BSR may be sent as, in, or along with, a scheduling request message. The scheduling request message may include a grant request or a grant request message. The BSR may include an indication of UL resources that UE 210 may be requesting for the corresponding packet stream(s) (e.g., packet streams 1-3).

Process 1000 may also include application 310 sending the additional packet streams (e.g., packet streams 2 and 3) to baseband processor 320 (at 1120). For example, after providing baseband processor 320 with prebooking information for packet streams 2 and 3, application 310 may proceed to provide packet streams 2 and 3 to baseband processor 320. Application 310 may do so according to a predetermined schedule or periodicity, which may have been sent to baseband processor 320 as prebooking information for packet streams 2 and 3. As shown, application 310 may send packet streams 2 and 3 prior to UE 210 receiving a resource grant from base station 222 for packet streams 2 and 3, which is why the BSR was for packet streams 1-3.

Process 1000 may include base station 222 sending a UL grant for packet streams 1-3 (block 1130). For example, upon receiving the BSR from UE 210, base station 222 may determine UL resources to allocate to UE 210 based on the BSR. And even though baseband processor 320 may not have received all of packet streams 1-3 when the BSR is transmitted, base station 222 may nevertheless proceed to generate a grant (e.g., a DG) for packet streams 1-3 since the BSR was generated for packet streams 1-3.

Accordingly, one or more of the techniques described herein may reduce transmission latency by: 1) reporting multiple packet streams before one or more of the packet streams has actually been received and buffered at baseband processor 320; and 2) ensuring that all of the reported packet streams are received at baseband processor 320 prior to the corresponding UL grant. Upon generating the UL grant, base station 222 may transmit the UL grant to UE 210, UE 210 may use the UL grant to transmit packet streams 1-3 to base station 222. In some implementations, baseband processor 320 may determine whether the grant allocation is an appropriate size for the corresponding data streams (e.g., data streams 1-3) by comparing a capacity of the UL grant to the volume of the data streams (block 1140).

When baseband processor 320 determines that the UL grant capacity exceeds the packet stream volume, baseband processor 320 may generate and add one or more dummy packets to one or more of the packet streams so that volume of the packet stream is equal to the capacity of the UL grant. Additionally, or alternatively, baseband processor 320 may determine whether application 310 is to continue sending packet streams to baseband processor 320. Upon determining that baseband processor 320 is to receive no more packet streams, baseband processor 320 may generate and add a dummy packet with a padding BSR to one or more of the packet streams (block 1150).

Process 1000 may include transmitting data packets of packet streams 1-3 to base station 222 via the UL grant resources (block 1160). Upon receiving the data packets, base station 222 may processes the data packets (block 1170), forward them to one or more intended recipients, etc. Additionally, when base station 222 determines that data packet includes a padding BSR, base station 222 may respond by discontinuing the allocation of UL resources to UE 210 for the corresponding application, service, or communication session.

Figure 12:
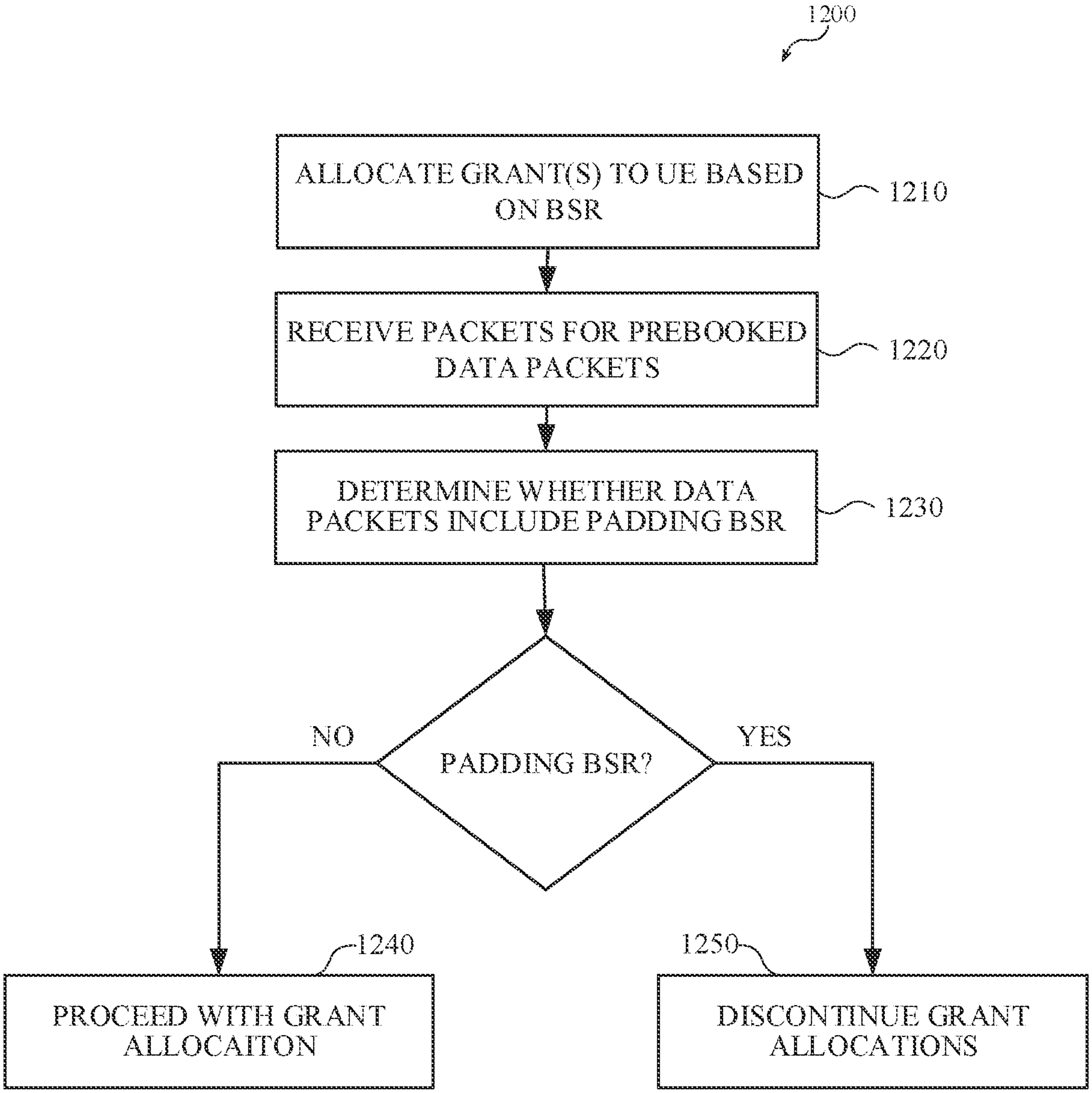
FIG. 12 is a diagram of an example of a process for allocating uplink (UL) resources according to one or more implementations described herein.

FIG. 12 is a diagram of an example of a process for allocating UL resources according to one or more implementations described herein. Process 1200 may be implemented by base station 222. In some implementations, some or all of process 1200 may be performed by one or more other systems or devices, including one or more of the systems or devices FIG. 3. Additionally, process 1200 may include one or more fewer, additional, differently ordered and/or arranged operations than those shown in FIG. 12. In some implementations, some or all of the operations of process 1200 may be performed independently, successively, simultaneously, etc., of one or more of the other operations of process 1200. As such, the techniques described herein are not limited to a number, sequence, arrangement, timing, etc., of the operations or process depicted in FIG. 12. Indeed, the techniques described herein may include additional and alternative versions of process 1200.

As shown, process 1200 may include allocating a grant to UE 210 based on a BSR (block 1210). For example, base station 222 may receive a BSR from UE 210. The BSR may be based on one or more packet streams, and one or more sets of prebooking information for additional packet streams, received at a baseband processor 320 of UE 210. In some implementations, the BSR may be received with, or as part of, a scheduling request message, a grant request message, and so on. The BSR may be received via CG UL resources previously allocated to UE 210 by base station 222. Base station 222 may determine a DG based on the BSR and may communicate the DG to UE 210.*s*

Process 1200 may include receiving packets for prebooked data packets (block 1220). For example, base station 222 may receive packets that were prebooked by baseband processor 320 of UE 210 and represented in the BSR. The prebooked data packets may be received via the DG allocated to UE 210 based on the BSR. The prebooked data packets may corresponding to additional data streams (e.g., data streams 2 and 3) and may be received with data packets corresponding to an initial or preceding data stream (e.g., data stream 1).

Process 1200 may include determining whether data packets include a padding BSR (block 1230). For example, base station 222 may analyze, processes, or monitor data packets (e.g., data packets of an initial packet stream or additional packet stream) to determine whether there is a data packet that includes a padding BSR. As described herein, a padding BSR may include a portion of a data packet indicating that no additional UL resource grants are required for transmitting packet streams to base station 222.

When a padding BSR is not found (block 1240), process 1200 may include proceeding with grant allocation. For example, Base station 222 may receive a new BSR (e.g., in a data packet or via another transmission) indicating additional packet data to be transmitted from UE 210 to base station 222. Accordingly, base station 222 may determine a UL resource grant based on the BSR and communicate the UL resource grant to UE 210. By contrast, when a padding BSR is detected (block 1250), process 1200 may include discontinuing UL grant allocations. For example, when base station 222 detects a padding BSR in a data packet received from UE 21-, base station 222 may discontinue or terminate an outstanding UL grant allocation (e.g., UL resources previously granted to UE 210 but not yet used) and/or any ongoing or scheduled UL grant allocation procedures for UE 210. As such, the techniques described herein enable UE 210 to cause base station 222 to terminate outstanding UL grant allocations (e.g., allocations that have been made but will not be used) and/or forego an ongoing or scheduled UL grant allocation that UE 210 will not use (e.g., since no more data packets are to be transmitted to base station 222).

Figure 13:
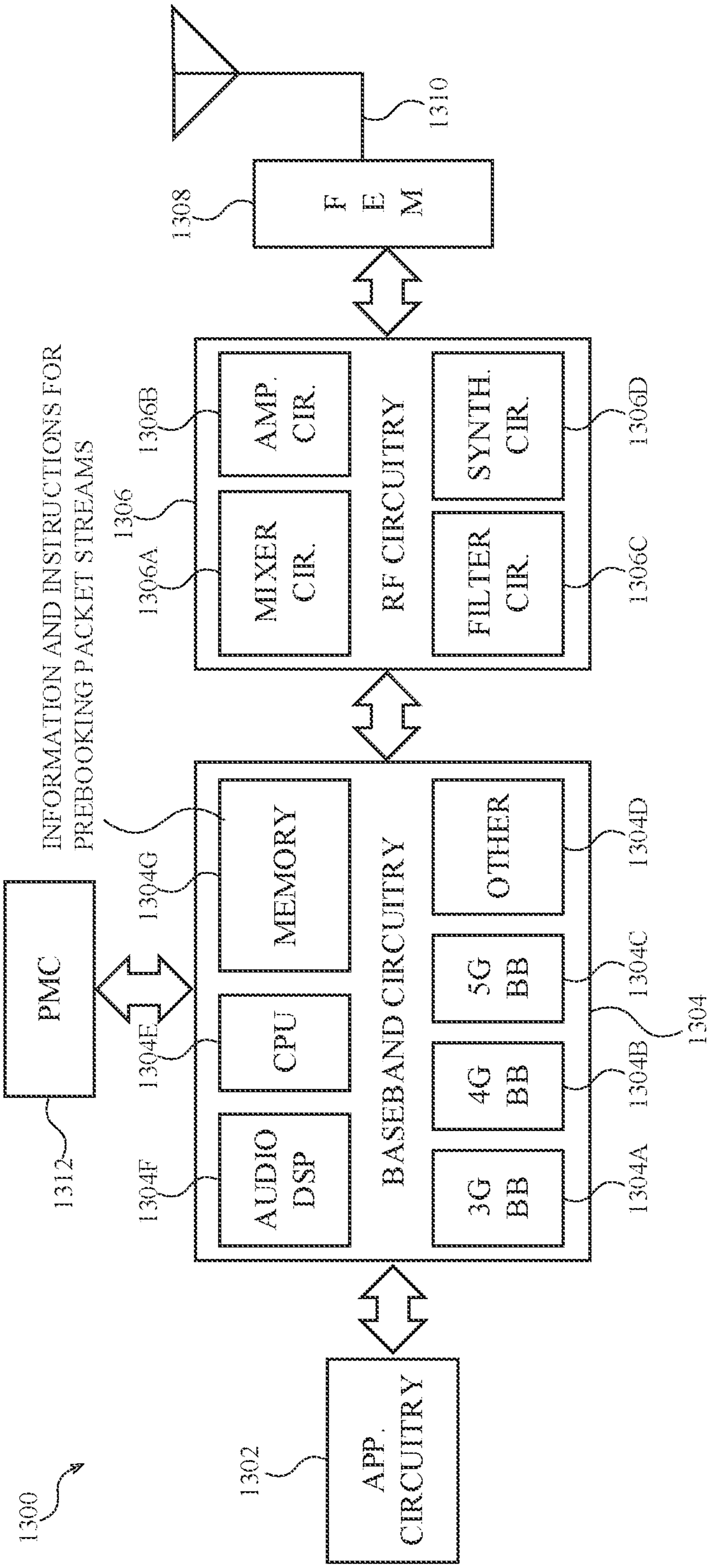
FIG. 13 is a diagram of an example of components of a device according to one or more implementations described herein.

FIG. 13 is a diagram of an example of components of a device according to one or more implementations described herein. In some implementations, the device 1300 can include application circuitry 1302, baseband circuitry 1304, RF circuitry 1306, front-end module (FEM) circuitry 1308, one or more antennas 1310, and power management circuitry (PMC) 1312 coupled together at least as shown. The components of the illustrated device 1300 can be included in a UE or a RAN node. In some implementations, the device 1300 can include fewer elements (e.g., a RAN node may not utilize application circuitry 1302, and instead include a processor/controller to process IP data received from a CN or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (CRAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 5G, 6G, etc.).

The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, modulation/demodulation circuitry of the baseband circuitry 1304 can include Fast-Fourier Transform (FFT), precoding, or constellation mapping/de-mapping functionality. In some implementations, encoding/decoding circuitry of the baseband circuitry 1304 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1304G may receive and/or store information and instructions for application data prebooking as described herein. For example, UE 210 and base station 222 may cooperate to enable a UL resources grant for multiple packet streams to be based on a single BSR. Application circuitry 1302 of UE 210 may send a baseband circuitry 1304 of UE 210 a first packet stream (e.g., packet stream 1) and prebooking information about one or more additional packet streams (e.g., packet streams 2, 3, and so on). The prebooking information may include a transmission time, a jitter, and a volume for each additional packet stream. The baseband circuitry 1304 may determine which (if any) of the additional packet streams are to arrive prior to a threshold duration from a BSR occasion. The BSR occasion may be a transmission time for the BSR via a CG. The threshold duration may be an amount of time ending prior to baseband circuitry 1304 receiving a UL grant (e.g., a DG) based on the BSR. a corresponding grant being received. That is, the threshold duration may expire before the UL grant is expected to arrive. The additional packet streams may arrive before the UL grant, such that UE 210 may be able to transmit the initial buffered packet stream and the additional buffered packet streams upon reception of the UL grant from base station 222. As described herein, UE 210 may also use dummy packets when a UL grant exceeds the volume of data packets of the packet streams. UE 210 may also, or alternatively use a padding BSR to cause base station 222 to discontinue allocating UL resources to UE 210.

In some implementations, the baseband circuitry 1304 can include one or more audio digital signal processor(s) (DSP) 1304F. The audio DSPs 1304F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1304 and the application circuitry 1302 can be implemented together such as, for example, on a system on a chip (SOC).

In some implementations, the baseband circuitry 1304 can provide for communication compatible with one or more radio technologies. For example, in some implementations, the baseband circuitry 1304 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1304 is configured to support radio communications of more than one wireless protocol can be referred to as multi-mode baseband circuitry.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path. In some implementations, the mixer circuitry 1306A of the receive signal path can be configured to down-convert RF signals received from the FEM circuitry 1308 based on the synthesized frequency provided by synthesizer circuitry 1306D. The amplifier circuitry 1306B can be configured to amplify the down-converted signals and the filter circuitry 1306C can be a low-pass filter (LPF) or band-pass filter (BPF) configured to remove unwanted signals from the down-converted signals to generate output baseband signals. Output baseband signals can be provided to the baseband circuitry 1304 for further processing. In some implementations, the output baseband signals can be zero-frequency baseband signals, although this is not a requirement. In some implementations, mixer circuitry 1306A of the receive signal path can comprise passive mixers, although the scope of the implementations is not limited in this respect.

In some implementations, the mixer circuitry 1306A of the transmit signal path can be configured to up-convert input baseband signals based on the synthesized frequency provided by the synthesizer circuitry 1306D to generate RF output signals for the FEM circuitry 1308. The baseband signals can be provided by the baseband circuitry 1304 and can be filtered by filter circuitry 1306C.

In some implementations, the mixer circuitry 1306A of the receive signal path and the mixer circuitry 1306A of the transmit signal path can include two or more mixers and can be arranged for quadrature down conversion and up conversion, respectively. In some implementations, the mixer circuitry 1306A of the receive signal path and the mixer circuitry 1306A of the transmit signal path can include two or more mixers and can be arranged for image rejection (e.g., Hartley image rejection). In some implementations, the mixer circuitry 1306A of the receive signal path and the mixer circuitry 1406A can be arranged for direct down conversion and direct up conversion, respectively. In some implementations, the mixer circuitry 1306A of the receive signal path and the mixer circuitry 1306A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1306 can include analog-to-digital converter (ADC) and digital-to-analog converter (DAC) circuitry and the baseband circuitry 1304 can include a digital baseband interface to communicate with the RF circuitry 1306.

In some dual-mode implementations, a separate radio IC circuitry can be provided for processing signals for each spectrum, although the scope of the implementations is not limited in this respect.

In some implementations, the synthesizer circuitry 1306D can be a fractional-N synthesizer or a fractional N/N+1 synthesizer, although the scope of the implementations is not limited in this respect as other types of frequency synthesizers can be suitable. For example, synthesizer circuitry 1306D can be a delta-sigma synthesizer, a frequency multiplier, or a synthesizer comprising a phase-locked loop with a frequency divider.

The synthesizer circuitry 1306D can be configured to synthesize an output frequency for use by the mixer circuitry 1306A of the RF circuitry 1306 based on a frequency input and a divider control input. In some implementations, the synthesizer circuitry 1306D can be a fractional N/N+1 synthesizer.

In some implementations, frequency input can be provided by a voltage-controlled oscillator (VCO), although that is not a requirement. Divider control input can be provided by either the baseband circuitry 1304 or the applications circuitry 1302 depending on the desired output frequency. In some implementations, a divider control input (e.g., N) can be determined from a look-up table based on a channel indicated by the applications circuitry 1302.

Synthesizer circuitry 1306D of the RF circuitry 1306 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1306D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1306 can include an IQ/polar converter.

FEM circuitry 1308 can include a receive signal path which can include circuitry configured to operate on RF signals received from one or more antennas 1310, amplify the received signals and provide the amplified versions of the received signals to the RF circuitry 1306 for further processing. FEM circuitry 1308 can also include a transmit signal path which can include circuitry configured to amplify signals for transmission provided by the RF circuitry 1306 for transmission by one or more of the one or more antennas 1310. In various implementations, the amplification through the transmit or receive signal paths can be done solely in the RF circuitry 1306, solely in the FEM circuitry 1308, or in both the RF circuitry 1306 and the FEM circuitry 1308.

In some implementations, the FEM circuitry 1308 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1306). The transmit signal path of the FEM circuitry 1308 can include a power amplifier (PA) to amplify input RF signals (e.g., provided by RF circuitry 1306), and one or more filters to generate RF signals for subsequent transmission (e.g., by one or more of the one or more antennas 1310).

In some implementations, the PMC 1312 can manage power provided to the baseband circuitry 1304. In particular, the PMC 1312 can control power-source selection, voltage scaling, battery charging, or DC-to-DC conversion. The PMC 1312 can often be included when the device 1300 is capable of being powered by a battery, for example, when the device is included in a UE. The PMC 1312 can increase the power conversion efficiency while providing desirable implementation size and heat dissipation characteristics.

While FIG. 13 shows the PMC 1312 coupled only with the baseband circuitry 1304. However, in other implementations, the PMC 1312 may be additionally or alternatively coupled with, and perform similar power management operations for, other components such as, but not limited to, application circuitry 1302, RF circuitry 1306, or FEM circuitry 1308.

In some implementations, the PMC 1312 can control, or otherwise be part of, various power saving mechanisms of the device 1300. For example, if the device 1300 is in an RRC_Connected state, where it is still connected to the RAN node as it expects to receive traffic shortly, then it can enter a state known as Discontinuous Reception Mode (DRX) after a period of inactivity. During this state, the device 1300 can power down for brief intervals of time and thus save power.

If there is no data traffic activity for an extended period of time, then the device 1300 can transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1302 and processors of the baseband circuitry 1304 can be used to execute elements of one or more instances of a protocol stack. For example, processors of the baseband circuitry 1304, alone or in combination, can be used execute Layer 3, Layer 2, or Layer 1 functionality, while processors of the baseband circuitry 1304 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 14:
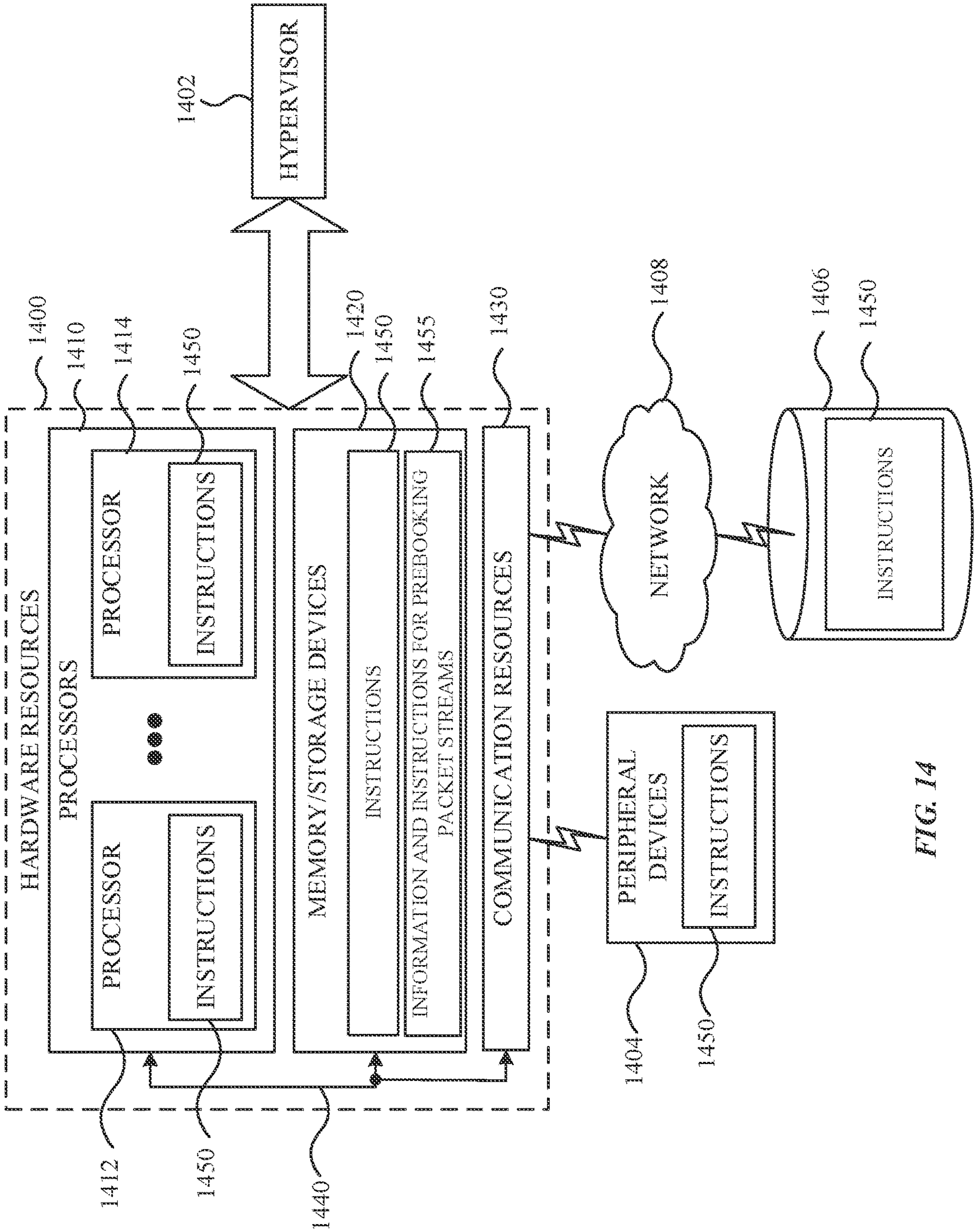
FIG. 14 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 14 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440. For implementations where node virtualization (e.g., NFV) is utilized, a hypervisor 1402 may be executed to provide an execution environment for one or more network slices/sub-slices to utilize the hardware resources 1400

The processors 1410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1412 and a processor 1414.

The memory/storage devices 1420 may include main memory, disk storage, or any suitable combination thereof. The memory/storage devices 1420 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory 1304G may receive and/or store information and instructions for application data prebooking as described herein.

In some implementations, memory/storage devices 1420 receive and/or store information and instructions 1455 for application data prebooking as described herein. UE 210 and base station 222 may cooperate to enable a UL resources grant for multiple packet streams to be based on a single BSR. An application of UE 210 may send a baseband processor of UE 210 a first packet stream (e.g., packet stream 1) and prebooking information about one or more additional packet streams (e.g., packet streams 2, 3, and so on). The prebooking information may include a transmission time, a jitter, and a volume for each additional packet stream. The baseband processor may determine which (if any) of the additional packet streams are to arrive prior to a threshold duration from a BSR occasion. The BSR occasion may be a transmission time for the BSR via a CG. The threshold duration may be an amount of time ending prior to baseband processor receiving a UL grant (e.g., a DG) based on the BSR. a corresponding grant being received. That is, the threshold duration may expire before the UL grant is expected to arrive. The additional packet streams may arrive before the UL grant, such that UE 210 may be able to transmit the initial buffered packet stream and the additional buffered packet streams upon reception of the UL grant from base station 222. As described herein, UE 210 may also use dummy packets when a UL grant exceeds the volume of data packets of the packet streams. UE 210 may also, or alternatively use a padding BSR to cause base station 222 to discontinue allocating UL resources to UE 210.

The communication resources 1430 may include interconnection or network interface components or other suitable devices to communicate with one or more peripheral devices 1404 or one or more databases 1406 via a network 1408. For example, the communication resources 1430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, baseband circuitry of a user equipment (UE), including a memory; and a baseband processor configured to, when executing instructions stored in the memory, cause the baseband processor to buffer a first packet stream received from an application; receive, from the application, prebooking information for a second packet stream, the prebooking information indicating an estimated arrival time and volume of the second packet stream; determine whether the estimated arrival time of the second packet stream precedes a predefined threshold time measured from a buffer status report (BSR) occasion; and when the estimated arrival time precedes the predefined threshold time, generate a BSR for the first packet stream and the second packet stream.

In example 2, which may also include one or more of the examples described herein, the baseband circuitry is further configured to when executing instructions stored in the memory, generate a BSR for the first packet stream when the estimated arrival time does not precede the predefined threshold time.

In example 3, which may also include one or more of the examples described herein, the baseband circuitry is further configured to when executing instructions stored in the memory, communicate, to a base station, the BSR for the first packet stream and the second packet stream; and receive, from the base station, an uplink (UL) resource grant for the first packet stream and the second packet stream.

In example 4, which may also include one or more of the examples described herein, the BSR is communicated to the base station via a configured grant (CG); and the UL resource grant received from the base station comprises a dynamic grant (DG).

In example 5, which may also include one or more of the examples described herein, the baseband circuitry is further configured to when executing instructions stored in the memory, the BSR indicates a volume of packets for the first packet stream and a volume of packets estimated for the second packet stream.

In example 6, which may also include one or more of the examples described herein, the baseband circuitry is further configured to when executing instructions stored in the memory, communicate the BSR to the base station regardless of whether the second packet stream is actually received and buffered by the baseband processor.

In example 7, which may also include one or more of the examples described herein, the baseband circuitry is further configured to when executing instructions stored in the memory, receive and buffer the second packet stream after communicating the BSR to the base station.

In example 8, which may also include one or more of the examples described herein, the BSR occasion comprises a prescheduled time to communicate the BSR to a base station via a CG.

In example 9, which may also include one or more of the examples described herein, the predefined threshold time expires after the BSR occasion and before a reception time of an uplink (UL) resource grant.

In example 10, which may also include one or more of the examples described herein, the baseband circuitry is further configured to when executing instructions stored in the memory, determine the predefined threshold time based on measured duration between BSRs transmitted to the base station and UL resource grants received from the base station.

In example 11, which may also include one or more of the examples described herein, the baseband circuitry is further configured to when executing instructions stored in the memory, use the UL resource grant to transmit the first packet stream and the second packet stream to the base station.

In example 12, which may also include one or more of the examples described herein, the baseband circuitry is further configured to when executing instructions stored in the memory, determine whether the UL resource grant is larger than a volume of the first packet stream and the second packet stream; and when the UL resource grant is larger than the volume of the first packet stream and the second packet stream, generate one or more dummy packets to satisfy a difference between the UL resource grant and the volume of the first packet stream and the second packet stream.

In example 13, which may also include one or more of the examples described herein, the baseband circuitry is further configured to when executing instructions stored in the memory, after transmitting the BSR for the first packet stream and the second packet stream to the base station, receive a third packet stream at the baseband processor; generate a BSR for the third packet stream; and use the UL resource grant transmit the first packet stream, the second packet stream, and the BSR for the third packet stream to the base station.

In example 14, which may also include one or more of the examples described herein, the baseband circuitry is further configured to when executing instructions stored in the memory, receive, from the application, prebooking information for a third packet stream, the prebooking information indicating an estimated arrival time and volume of the third packet stream; determine whether the estimated arrival time of the third packet stream precedes the predefined threshold time measured from the BSR occasion; and generate an additional BSR for the first packet stream, the second packet stream, and the third packet stream when the estimated arrival time precedes the predefined threshold time.

In example 15, which may also include one or more of the examples described herein, the baseband circuitry is further configured to when executing instructions stored in the memory, communicate, to a base station, the BSR for the first packet stream, the second packet stream, and the third packet stream; receive, from the base station, an uplink (UL) resource grant for the first packet stream, the second packet stream, and the third packet stream; and use the UL resource grant to transmit the first packet stream and the second packet stream to the base station.

In example 16, which may also include one or more of the examples described herein, a user equipment (UE) includes a memory; and one or more processors configured to, when executing an application stored in the memory, cause the UE to: generate a first packet stream of the application; communicate the first packet stream to a baseband processor of the UE; generate prebooking information for one or more additional packet streams, the prebooking information, for the one or more additional packet streams, comprising a prescheduled transmission time for a second packet stream, a jitter associated with transmitting the second packet stream to the a baseband processor of the UE, and a volume of the second packet stream; and communicate the prebooking information to the baseband processor of the UE.

In example 17, which may also include one or more of the examples described herein, the one or more processors are further configured to when executing instructions stored in the memory, communicate the second packet stream to the baseband processor in accordance with the prescheduled transmission time and the jitter.

In example 17, which may also include one or more of the examples described herein, the second packet stream arrives at the baseband processor before a threshold duration measured from a buffer status report (BSR) occasion for sending a BSR to a base station, and the BSR includes an indication of a value of the first packet stream and the volume of the second packet stream.

In example 18, which may also include one or more of the examples described herein, the one or more processors are further configured to when executing instructions stored in the memory, In example 19, which may also include one or more of the examples described herein, a base station, includes a memory; and one or more processors configured to, when executing instructions stored in the memory, cause the base station to: transmit a configured grant (CG) to a user equipment (UE); receive, via resources scheduled by the CG, a buffer status report (BSR) including an indication of a volume of a first packet stream and a volume of a second packet stream; transmit, to the UE, a dynamic grant (DG) for UL resources for the UE based on the volume of the first packet stream and the volume of the second packet stream; and receive, via the UL resources, the first packet stream and the second packet stream.

In example 20, which may also include one or more of the examples described herein, the one or more processors are further configured to when executing instructions stored in the memory, cause the base station to monitor data packets of the first packet stream and the second packet stream; disregard data packets comprising dummy packets; when another BSR is detected among the data packets, transmit, to the UE, another DG for additional UL resources for the UE based on the another BSR; and when a padding BSR is detected among the data packets, refrain, based on the padding BSR, from transmitting another DG.

In example 21, a method includes steps or functions performed by a baseband circuitry or one or more processors of one or more of the examples described herein.

In example 22, an apparatus includes means for performing steps or functions performed by a baseband circuitry or one or more processors of one or more of the examples described herein.

In example 23, a user equipment (UE) includes the baseband circuitry of one or more of the examples 1-15.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. Baseband circuitry of a user equipment (UE), comprising:

a memory; and a baseband processor configured to, when executing instructions stored in the memory, cause the baseband processor to:

buffer a first packet stream received from an application;

receive, from the application, prebooking information for a second packet stream, the prebooking information indicating an estimated arrival time and volume of the second packet stream;

determine whether the estimated arrival time of the second packet stream precedes a predefined threshold time measured from a buffer status report (BSR) occasion; and when the estimated arrival time precedes the predefined threshold time, generate a BSR for the first packet stream and the second packet stream.

2. The baseband circuitry of claim 1, further configured to, when executing instructions stored in the memory:

generate a BSR for the first packet stream when the estimated arrival time does not precede the predefined threshold time.

3. The baseband circuitry of claim 1, further configured to, when executing instructions stored in the memory:

communicate, to a base station, the BSR for the first packet stream and the second packet stream; and receive, from the base station, an uplink (UL) resource grant for the first packet stream and the second packet stream.

4. The baseband circuitry of claim 3, wherein the BSR is communicated to the base station via a configured grant (CG); and the UL resource grant received from the base station comprises a dynamic grant (DG).

5. The baseband circuitry of claim 3, wherein the BSR indicates a volume of packets for the first packet stream and a volume of packets estimated for the second packet stream.

6. The baseband circuitry of claim 3, further configured to, when executing instructions stored in the memory, communicate the BSR to the base station regardless of whether the second packet stream is actually received and buffered by the baseband processor.

7. The baseband circuitry of claim 3, further configured to, when executing instructions stored in the memory, receive and buffer the second packet stream after communicating the BSR to the base station.

8. The baseband circuitry of claim 1, wherein the BSR occasion comprises a prescheduled time to communicate the BSR to a base station via a CG.

9. The baseband circuitry of claim 8, wherein the predefined threshold time expires after the BSR occasion and before a reception time of an uplink (UL) resource grant.

10. The baseband circuitry of claim 9, further configured to, when executing instructions stored in the memory:

determine the predefined threshold time based on measured duration between BSRs transmitted to the base station and UL resource grants received from the base station.

11. The baseband circuitry of claim 9, further configured to, when executing instructions stored in the memory:

use the UL resource grant to transmit the first packet stream and the second packet stream to the base station.

12. The baseband circuitry of claim 11, further configured to, when executing instructions stored in the memory:

determine whether the UL resource grant is larger than a volume of the first packet stream and the second packet stream; and when the UL resource grant is larger than the volume of the first packet stream and the second packet stream, generate one or more dummy packets to satisfy a difference between the UL resource grant and the volume of the first packet stream and the second packet stream.

13. The baseband circuitry of claim 11, further configured to, when executing instructions stored in the memory:

after transmitting the BSR for the first packet stream and the second packet stream to the base station, receive a third packet stream at the baseband processor;

generate a BSR for the third packet stream; and use the UL resource grant to transmit the first packet stream, the second packet stream, and the BSR for the third packet stream to the base station.

14. The baseband circuitry of claim 1, further configured to, when executing instructions stored in the memory:

receive, from the application, prebooking information for a third packet stream, the prebooking information for the third packet stream indicating an estimated arrival time and volume of the third packet stream;

determine whether the estimated arrival time of the third packet stream precedes the predefined threshold time measured from the BSR occasion; and generate an additional BSR for the first packet stream, the second packet stream, and the third packet stream when the estimated arrival time precedes the predefined threshold time.

15. The baseband circuitry of claim 14, further configured to, when executing instructions stored in the memory:

communicate, to a base station, the BSR for the first packet stream, the second packet stream, and the third packet stream;

receive, from the base station, an uplink (UL) resource grant for the first packet stream, the second packet stream, and the third packet stream; and use the UL resource grant to transmit the first packet stream and the second packet stream to the base station.

16. User equipment (UE), comprising:

a memory; and one or more processors configured to, when executing an application stored in the memory, cause the UE to:

generate a first packet stream of the application;

communicate the first packet stream to a baseband processor of the UE;

generate prebooking information for one or more additional packet streams, the prebooking information for the one or more additional packet streams, comprising a prescheduled transmission time for a second packet stream, a jitter associated with transmitting the second packet stream to a baseband processor of the UE, and a volume of the second packet stream; and communicate the prebooking information to the baseband processor of the UE.

17. The UE of claim 16, wherein the one or more processors are configured to, when executing an application stored in the memory, communicate the second packet stream to the baseband processor in accordance with the prescheduled transmission time and the jitter.

18. The UE of claim 17, wherein the second packet stream arrives at the baseband processor before a threshold duration measured from a buffer status report (BSR) occasion for sending a BSR to a base station, and the BSR includes an indication of a value of the first packet stream and the volume of the second packet stream.

19. A base station, comprising:

a memory; and one or more processors configured to, when executing instructions stored in the memory, cause the base station to:

transmit a configured grant (CG) to a user equipment (UE);

receive, via resources scheduled by the CG, a buffer status report (BSR) including an indication of a volume of a first packet stream and a volume of a second packet stream;

transmit, to the UE, a dynamic grant (DG) for UL resources for the UE based on the volume of the first packet stream and the volume of the second packet stream;

receive, via the UL resources, the first packet stream and the second packet stream;

when another BSR is detected among UL data packets, transmit, to the UE, another DG for additional UL resources for the UE based on the another BSR; and when a padding BSR is detected among the data packets, refrain from transmitting another DG.

20. The base station of claim 19, wherein one or more processors are further configured to, when executing instructions stored in the memory, cause the base station to:

monitor data packets of the first packet stream and the second packet stream; and disregard data packets comprising dummy packets.

* * * * *